US012665714B2

(12) United States Patent
Hui et al.

(10) Patent No.: US 12,665,714 B2
(45) Date of Patent: ***Jun. 23, 2026

(54) REFERENCE SIGNALING FOR WIRELESS COMMUNICATION

(71) Applicant: Telefonaktiebolaget LM Ericsson (publ), Stockholm (SE)

(72) Inventors: Dennis Hui, Sunnyvale, CA (US); Jung-Fu Cheng, Fremont, CA (US); Mehrnaz Afshang, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 444 days.

This patent is subject to a terminal disclaimer.

(21) Appl. No.: 18/308,880

(22) Filed: Apr. 28, 2023

(65) Prior Publication Data

US 2023/0299911 A1     Sep. 21, 2023

Related U.S. Application Data

(63) Continuation-in-part of application No. 17/067,308, filed on Oct. 9, 2020, now Pat. No. 11,671,217.

(51) Int. Cl.
H04W 72/04        (2023.01)
H04L 5/00          (2006.01)
H04W 76/00        (2018.01)

(52) U.S. Cl.
CPC .................................. H04L 5/0048 (2013.01)

(58) Field of Classification Search
None
See application file for complete search history.

(56) References Cited

U.S. PATENT DOCUMENTS

| | | | | |
|---|---|---|---|---|
| 11,671,217 B2 * | 6/2023 | Hui | ................... | H04L 27/26136 |
| | | | | 370/329 |
| 2010/0272040 A1 | 10/2010 | Nam et al. | | |
| 2019/0140801 A1 | 5/2019 | Ko et al. | | |
| 2021/0203551 A1 * | 7/2021 | Liu | ....................... | H04L 5/0051 |
| 2021/0409173 A1 | 12/2021 | Chatterjee et al. | | |
| 2022/0038238 A1 * | 2/2022 | Liu | ....................... | H04L 5/0048 |

(Continued)

FOREIGN PATENT DOCUMENTS

| | | | | |
|---|---|---|---|---|
| EP | 1681821 A2 | 7/2006 | | |
| EP | 3813288 A1 * | 4/2021 | ............ | H04W 72/23 |

(Continued)

OTHER PUBLICATIONS

International Search Report and Written Opinion dated Aug. 27, 2021 for International Application No. PCT/SE2021/050509 filed Jun. 2, 2021, consisting of 13-pages.

(Continued)

*Primary Examiner* — Maharishi V Khirodhar
(74) *Attorney, Agent, or Firm* — Weisberg I.P. Law, P.A.

(57) ABSTRACT

There is disclosed a method of operating a transmitting radio node in a wireless communication network, the method including transmitting reference signaling based on a reference pilot sequence, the reference pilot sequence being one of a set of reference pilot sequences, at least one reference pilot sequence of the set being a subsequence of another reference pilot sequence of the set. The disclosure also pertains to related devices and methods.

18 Claims, 9 Drawing Sheets

(56) References Cited

U.S. PATENT DOCUMENTS

2024/0097844 A1* 3/2024 Baldemair .......... H04L 27/2613

FOREIGN PATENT DOCUMENTS

WO      2018063078 A1     4/2018
WO      2019/157914 A1     8/2019

OTHER PUBLICATIONS

Mahbuba Sheba Ullah et al.; Low Power Pilot Aided Sub-Sample Based Channel Estimation for MMWave Cellular Systems; ICASSP 2019-2019 IEEE International Conference on Acoustics, Speech and Signal Processing (ICASSP), 2019, consisting of 5-pages.
Wang Yanwen et al.; Research on Physical Downlink Control Channel Transmission Mode for 5G New Radio; CASSP 2019 7th International Conference on Information, Communication and Networks (ICICN), 2019, consisting of 5-pages.
Communication Pursuant to Article 94(3) EPC dated May 6, 2025 issued in corresponding European Patent Application No. 21 730 306.4, consisting of 5 pages.

* cited by examiner

REFERENCE SIGNALING FOR WIRELESS COMMUNICATION

CROSS-REFERENCE TO RELATED APPLICATIONS

This application is a continuation of U.S. application Ser. No. 17/067,308, filed Oct. 9, 2020, entitled "REFERENCE SIGNALING FOR WIRELESS COMMUNICATION", the entirety of which is incorporated herein by reference.

TECHNICAL FIELD

This disclosure pertains to wireless communication technology, in particular for high frequencies.

BACKGROUND

For future wireless communication systems, use of higher frequencies is considered, which allows large bandwidths to be used for communication. However, use of such higher frequencies brings new problems, for example regarding physical properties and timing. Ubiquitous or almost ubiquitous use of beamforming, with often comparatively small beams, may provide additional complications that need to be addressed.

SUMMARY

It is an object of this disclosure to provide improved approaches of handling wireless communication, in particular regarding control signaling and/or associated reference signaling. Control signaling may be provided by a transmitting (radio) node, e.g. a network node, to allow a receiving (radio) node like a user equipment to communicate, e.g. according to a scheduling grant or scheduling assignment.

The approaches are particularly suitable for millimeter wave communication, in particular for radio carrier frequencies around and/or above 52.6 GHz, which may be considered high radio frequencies (high frequency) and/or millimeter waves. The carrier frequency/ies may be between 52.6 and 140 GHz, e.g. with a lower border between 52.6, 55, 60, 71 GHz and/or a higher border between 71, 72, 90, 114, 140 GHz or higher, in particular between 55 and 90 GHz, or between 60 and 72 GHz; however, higher frequencies may be considered, in particular frequency of 71 GHz or 72 GHz or above, and/or 100 GHz or above, and/or 140 GHz or above. The carrier frequency may in particular refer to a center frequency or maximum frequency of the carrier. The radio nodes and/or network described herein may operate in wideband, e.g. with a carrier bandwidth of 1 GHz or more, or 2 GHz or more, or even larger, e.g. up to 8 GHz; the scheduled or allocated bandwidth may be the carrier bandwidth, or be smaller, e.g. depending on channel and/or procedure. In some cases, operation may be based on an OFDM waveform or a SC-FDM waveform (e.g., downlink and/or uplink), in particular a FDF-SC-FDM-based waveform. However, operation based on a single carrier waveform, e.g. SC-FDE (which may be pulse-shaped or Frequency Domain Filtered, e.g. based on modulation scheme and/or MCS), may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam. Operation may be based on and/or associated to a numerology, which may indicate a subcarrier spacing and/or duration of an allocation unit and/or an equivalent thereof, e.g., in comparison to an OFDM based system. A subcarrier spacing or equivalent frequency interval may for example correspond to 960 kHZ, or 1920 kHz, e.g. representing the bandwidth of a subcarrier or equivalent.

The approaches are particularly advantageously implemented in a future 6th Generation (6G) telecommunication network or 6G radio access technology or network (RAT/RAN), in particular according to 3GPP (3$^{rd}$ Generation Partnership Project, a standardisation organization). A suitable RAN may in particular be a RAN according to NR, for example release 18 or later, or LTE Evolution. However, the approaches may also be used with other RAT, for example future 5.5G systems or IEEE based systems.

There is disclosed a method of operating a transmitting radio node in a wireless communication network. The method comprises transmitting reference signaling based on a reference pilot sequence, the reference pilot sequence being one of a set of reference pilot sequences, at least one reference pilot sequence of the set being a subsequence of another reference pilot sequence of the set.

Moreover, a transmitting radio node for a wireless communication network is described. The transmitting radio node is adapted for transmitting reference signaling based on a reference pilot sequence, the reference pilot sequence being one of a set of reference pilot sequences, at least one reference pilot sequence of the set being a subsequence of another reference pilot sequence of the set.

Also, there is considered a method of operating a receiving radio node in a wireless communication network. The method comprises receiving reference signaling based on a reference pilot sequence, the reference pilot sequence being one of a set of reference pilot sequences, at least one reference pilot sequence of the set being a subsequence of another reference pilot sequence of the set.

A receiving radio node for a wireless communication network is proposed. The receiving radio node is adapted for receiving reference signaling based on a reference pilot sequence, the reference pilot sequence being one of a set of reference pilot sequences, at least one reference pilot sequence of the set being a subsequence of another reference pilot sequence of the set.

Transmitting reference signaling may comprise transmitting control signaling associated to the reference signaling, and/or transmitting control signaling comprising the reference signaling. Receiving reference signaling may be part of receiving control signaling, and/or of communicating based on received control signaling. Receiving reference signaling based on a reference pilot sequence may comprise monitoring a control region or associated search space for the reference signaling and/or pilot sequence, and/or identifying the signaling and/or sequence, and/or using the sequence for a channel estimation and/or as an intermediate result for channel estimation of a larger sequence, e.g. a sequence the sequence is a subsequence of. The reference signaling transmitted may be first reference signaling; and/or transmitted control signaling may be first control signaling.

The set may comprise multiple sequences, wherein each sequence may be of a pair or n-tuple of sequence and subsequences (e.g., one sequence and n–1 subsequences; n=2 for a pair). A reference pilot sequence may also be referred to as reference signal sequence or modulation symbol sequence or symbol sequence or signal sequence. It may comprise of a plurality of symbols which may be mapped to time and/or frequency resources, such that a symbol or signal of a sequence may be mapped to a time/frequency resource (e.g., RE). The sequence may be free of higher layer signaling or encoded information; the sequence may allow channel estimation, e.g. to demodulate associated control signaling.

In particular, each reference pilot sequence of the set may be associated to control signaling, e.g. of a set of control signalings, and/or to aggregation levels of control signaling. Thus, different aggregation levels may be efficiently handled.

In general, different reference pilot sequences of the set may be associated to control signalings of different aggregation levels; each reference pilot sequence may be associated to a different aggregation level. In general, different reference pilot sequences may have different lengths, e.g. in number of signals/symbols, and/or may be mapped to different time/frequency domain resources. However, different time/frequency resources may overlap partly. It should be noted that the sequences of the set may be for potential and/or available reference signaling; only one sequence may be used for each transmission. Resources and/or characteristics associated to a sequence and/or signaling of a set may represented predefined and/or configured or configurable or otherwise set resources and/or characteristics that are intended and/or applicable for transmitting the signaling or sequence.

In general, a subsequence of a sequence may be determined by and/or based on and/or represented or representable by truncation or decimation. Truncation may for example comprise using sequence elements (m, m+1, m+2, . . . , m+n) for m,n=integer out of elements (1 . . . O) with O>=m+n of a sequence. Decimation may comprise using every nth element of a sequence. A subsequence may in general be used as representative for a sequence (in a given time/frequency domain location shared by the sequence and subsequence, for example).

In general, a subsequence and an associated reference pilot sequence (of which the subsequence is a subsequence) may be associated to the same time/frequency location, e.g. a common time/frequency location. The common time/frequency location may comprise the sequence or subsequence (and/or the subsequence may be mapped thereto), wherein the sequence the subsequence is associated to may be associated to a larger or smaller time/frequency location. The subsequence may be associated to a larger frequency domain extension (larger bandwidth) than the sequence it is a subsequence of, or to a smaller frequency domain extension (smaller bandwidth); the size of the sequence or subsequence may be optimised for such extensions, e.g. allowing use of a larger sequence (number of signals or symbols) for a given bandwidth.

It may be considered that the reference pilot sequences of the set are based on one or more Zadoff-Chu sequences. In particular, the sequences may be based on the same root sequence (e.g., being subsequences thereof or the root sequence). Such sequences have good correlation features, allowing reliable channel estimation.

In some variants, the set of reference pilot sequences may comprise, and/or consist of one reference pilot sequence and subsequences thereof. In other variants, there may subsequences of different pilot sequences, e.g. such that there at least two subsets of sequences, each subset comprising or consisting of a sequence and one or more subsequences thereof, with different subsets having different sequences. This allows different types of control signaling to be covered. In general, a set of pilot sequences and/or a subset may be associated to one type or format of control signaling, e.g. at different aggregation levels.

Additionally, or alternatively, a method of operating a transmitting radio node in a wireless communication network may comprise transmitting first control signaling in a control region, the first control signaling having at least a first signaling characteristic from a set of signaling characteristics, wherein the signaling characteristics of the set of signaling characteristics are associated to the control region.

Alternatively, or additionally, a transmitting radio node for a wireless communication network may be adapted for transmitting first control signaling in a control region, the first control signaling having at least a first signaling characteristic from a set of signaling characteristics, wherein the signaling characteristics of the set of signaling characteristics are associated to the control region.

Moreover, a method of operating a receiving radio node in a wireless communication network is described. The method comprises communicating with a network node and/or a transmitting radio node based on first control signaling received in a control region, the first control signaling having at least a first signaling characteristic from a set of signaling characteristics, wherein the signaling characteristics of the set of signaling characteristics are associated to the control region.

There is also considered a receiving radio node for a wireless communication network. The receiving radio node is adapted for communicating with a network node and/or a transmitting radio node based on first control signaling received in a control region. The first control signaling has at least a first signaling characteristic from a set of signaling characteristics, wherein the signaling characteristics of the set of signaling characteristics are associated to the control region.

The approaches described herein allow efficient control signaling, in particular with low processing requirements within the control region and/or associated search space. The set of signaling characteristics may in general pertain to a set of different values for the same parameter, e.g. different aggregation levels and/or different durations, or similar. Channel estimation in a control region may be simplified, as the reference signaling structure given by the sequence allows reusing signals to evaluate a plurality of candidates for control signaling.

The reference signaling may be associated to the control signaling. Control signaling may be associated to and/or be represented by signaling on a physical control channel, in particular a PDCCH or PSCCH. In some cases, control signaling may represent coded information, e.g. error coded information (e.g., with error correction coding like CRC, and/or in some cases forward error coding). In other cases, control signaling may be represented by a signaling sequence, which for example may comprise a plurality of modulation symbols of specified and/or configured and/or predefined content or meaning. Control signaling may represent a scheduling grant and/or scheduling assignment. The first control signaling may represent one control information message, e.g. a DCI message or SCI message. Communicating based on received control signaling may comprise transmitting and/or receiving signaling like data signaling as scheduled by the control signaling, and/or performing link adaptation and/or power control and/or beam management and/or measurements according to the control information represented and/or carried by the control signaling.

In particular, the set of signaling characteristics may be and/or may comprise a set of aggregation levels available for control signaling. Thus, different control signalings may differ in aggregation level. Control signalings with different aggregation levels may represent the same information content and/or format, and/or for example may differ in duration and/or repetition and/or total transmission power and/or frequency domain extension. The set of signaling characteristics may be associated to control signalings of the same type and/or format and/or information content. The aggregation level of the first control signaling may be unknown to the receiving radio node; approaches described herein allow easy monitoring of the control region and/or associated search space and identifying transmitted control signaling, e.g. based on blind detection. In such blind detection, a receiving radio node may evaluate and/or estimate which candidate signaling is the most likely to be the actually transmitted signaling, e.g. the first control signaling.

It may be considered that a duration of first control signaling is associated to the first signaling characteristic. In particular, different durations may be associated to different signaling characteristics; e.g., different aggregation levels may be associated to different durations. Thus, the control signaling may be spread out over time, e.g. for high aggregation levels.

Alternatively, or additionally, a frequency distribution of first control signaling may be associated to the first signaling characteristic. The frequency distribution may refer to a frequency domain extension, e.g. a contiguous extension over one frequency domain interval like neighbouring subcarriers, or to a non-contiguous extension, e.g. over a plurality of non-neighbouring intervals and/or subcarriers (or groups or blocks of subcarriers).

To different signaling characteristics of the set, different durations and/or frequency domain extensions or distributions may be associated. For example, to each signaling characteristic of the set, there may be associated a different duration and/or frequency domain extension or distribution; however, in some cases, (at least some) different signaling characteristics may have associated the same duration and/or frequency domain extension or distribution.

It may be considered that the first control signaling comprises and/or has associated to it first reference signaling, in particular Demodulation Reference Signaling, DMRS, and/or tracking reference signaling, e.g. phase tracking RS and/or timing tracking RS and/or position tracking RS. The first reference signaling may be transmitted before the control signaling and/or leading control information of the control signaling, e.g. in a first allocation unit or block symbol carrying control signaling (or a group of first symbols or allocation units). The set of signaling characteristics may represent reference signaling, e.g. its duration and/or location (e.g., in time and/or frequency domain, and/or within the control region) and/or number of repetitions and/or signaling sequence representing the signaling. In some cases, the (first) reference signaling may be considered part of the control signaling, in particular if the set of signaling characteristics pertain to the reference signaling. In other cases, reference signaling may be considered separately, e.g. if it may be indicated and/or configured separately from the control signaling.

In some variants, the first control signaling may be from a set of control signalings available for transmission in the control region. Each of the set of control signalings may be associated to a signaling characteristic from the set of signaling characteristics. The sets may be configured or configurable together (e.g., jointly, with the same message or same parametrisation) or separately (or independent from each other), e.g. with higher layer signaling and/or broadcast signaling, and/or may be predefined. This allows low overhead for control signaling and/or configurations.

It may be considered that the location of reference signaling (e.g., associated to the first control signaling) in the control region is from a set of nested locations. The nested locations may be associated to a set of control signaling and/or associated reference signaling.

In general, the first reference signaling may be associated to the first control signaling, the first reference signaling being from a set of reference signalings. Each (potential) reference signaling may be associated to a location; the locations of different reference signalings may be nested such that they at least partially overlap in time and frequency domain. In particular, each of the reference signalings of the set may cover and/or occupy and/or carried on at least on common allocation unit and/or share a common frequency time interval (while some may extend over the common unit and/or interval). The total resource size (e.g., duration x frequency domain extension) may be the same for (at least some or all) of the reference signalings. Reference signaling may in particular lead control information of the control signaling in time domain. Different allocation units or block symbols carrying reference signaling may carry the same signaling (e.g., a repetition), or different signaling (e.g., different parts of a signaling sequence). It may be considered that the reference signaling in the common allocation unit and/or interval is the same for the different reference signalings. Accordingly, channel estimation results may be used when evaluating control signaling candidates.

It may in general be considered that duration and/or frequency domain extension of first reference signaling associated to the first control signaling may be associated to the first signaling characteristic. In general, a characteristic being associated to another characteristic may indicate that the characteristics may be linked, e.g. unambiguously associated, to each other, e.g., one may be dependent on the other (or vice versa, or both), and/or that a receiver may determine one based on the other. For example, from the duration and/or frequency extension, of received first control signaling, the aggregation level may be retrievable, or vice versa. It may be considered that for different aggregation levels, different processing may be necessary, e.g. in terms of decoding and/or soft-combing of signaling. Signaling of different aggregation levels may be withing the control region and/or associated to one transmission occasion, e.g. one uninterrupted and/or contiguous transmission of controls signaling (and possible reference signaling associated thereto). A time domain resource may be represented by a block symbol or allocation unit; a frequency domain resource may be represented by a (e.g., contiguous) frequency interval, e.g. one or more (e.g., contiguous or neighbouring) subcarriers or blocks of subcarriers. A location in time and/or frequency domain may indicate exactly which time and/or frequency domain resources is referred to, e.g. which time and/or frequency domain resource/s a signaling candidate would occupy or signaling occupies. Signalings or signaling candidate may be considered to overlap in time and/or frequency domain for the common allocation unit/s and/or interval/s they share. Different control signaling candidates and/or associated (potential) reference signaling may share resources with different time and/or frequency domain extensions. It may be considered that each potential control signaling (of the set of signalings) and/or reference signaling (e.g., of a set of reference signalings) has at least one time and/or frequency resource in common with each other signaling of the set; it may be the same at least one time and/or frequency resource for all (control or reference) signalings, or a different one. A location may be defined and/or represented by a start and an extension in the associated domain/s, e.g. a starting allocation unit and/or starting subcarrier (e.g., lowest subcarrier) or frequency domain start (e.g., lowest frequency or lower frequency border).

A control region generally may comprise time and/or frequency domain resources. A control region may be intended and/or indicated and/or configured, e.g. with higher layer signaling, for transmission of control signaling, in particular first control signaling. A control region may be periodic or aperiodic; in some cases, it may repeat at certain time intervals (e.g., within a larger time interval) or be set or triggered or indicated for limited usage, e.g. in general in relation to a timing structure like a frame structure associated to the wireless communication network and/or used therein. A control region may be represented by a CORESET or a resource set in time and/or frequency domain. To a control region, there may be associated a search space. The search space may contain and/or be based on the control region. In this disclosure, features associated to a control region may be associated to the associated search space and vice versa. A search space may provide parameters and/or features associated to control signaling to be expected and/or processed and/or received and/or transmitted on resource of the control region, e.g. one or more signaling characteristics of control signaling associated to the search space, e.g. type of control signaling (e.g., format) and/or allowable aggregation level and/or possible location in the control region. It should be noted that the control region may be shifted in time domain from the perspective of the transmitter and receiver, e.g. due to delay effects and/or travel time of signaling. However, the same term will be used for both perspectives, as there will be an unambiguous association; in particular, the transmitter will intend reception in the control region of the receiver. A control region and/or search space may be configured by a network, e.g. a transmitting radio node, e.g. with higher layer signaling and/or broadcast signaling. A search space may be device-specific (e.g., configured specifically for one device, and/or with unicast signaling) or a common search space, e.g. configured with multicast and/or broadcast signaling. A control region may span one or more block symbols and/or allocation units and/or have an extension in frequency domain corresponding to a control region bandwidth and/or a plurality of subcarriers or resource blocks, e.g. physical and/or virtual resource blocks. It should be noted that control signaling of the set of control signalings may comprise control signaling that may occupy time/frequency resource/s (e.g., a set of resources) included in the control region and/or search space, but do not necessarily have to use all resources of the control region and/or search space. In general, the control region and/or search space may represent resources (e.g., a set of time/frequency resources) a receiver may monitor and/or search for control signaling, e.g. control signaling addressed to and/or intended for the receiver. Parameters and/or characteristics of the search space may limit and/or define the monitoring in more detail.

The transmitting radio node may comprise, and/or be adapted to utilise, processing circuitry and/or radio circuitry, in particular a transmitter and/or transceiver, to process (e.g., trigger and/or schedule) and/or transmit control signaling and/or reference signaling. The transmitting radio node may in particular be a network node or base station, and/or a network radio node; it may be implemented as an IAB or relay node. However, in some cases, e.g. a sidelink scenario, it may be a wireless device. The receiving radio node may comprise, and/or be adapted to utilise, processing circuitry and/or radio circuitry, in particular a receiver and/or transmitter and/or transceiver, to receive and/or process (e.g. receive and/or demodulate and/or decode and/or perform blind detection and/or schedule or trigger such) reference signaling and/or control signaling. Receiving may comprise demodulating and/or decoding the signaling, e.g. based on associated reference signaling, in particular DMRS and/or tracking reference signaling, based on which timing and/or channel estimation may be performed. The receiving radio node may in particular be a wireless device like a terminal or UE. However, in some cases, e.g. IAB or relay scenarios or multiple-RAT scenarios, it may be network node or base station, and/or a network radio node, for example an IAB or relay node.

The set of signaling characteristics and/or set of signalings may in general be predefined and/or configured to the receiving radio node, e.g. with higher layer signaling and/or broadcast signaling, e.g. from the transmitting radio node or the network. A set of signalings may represent available or possible control signalings, which may for example be transmitted (and/or be received) in the control region and/or associated search space. As such, control signalings of the set of control signalings, may represent candidate signalings (e.g., for which to monitor), e.g. PDCCH candidates or DCI candidates or PSCCH candidates. The first control signaling may represent the actually transmitted (and preferably correctly received and identified) control signaling from the set. The set of signaling characteristics may represent potential characteristics of the set of signalings or candidates; the first signaling characteristic may correspond to a characteristic of the first control signaling. It may generally be considered that the set of signaling characteristic pertains to a plurality of characteristics (e.g., each member of the set representing a subset of characteristics, e.g. different types like aggregation level and/or duration and/or reference signaling and/or location), or a subset of characteristics with more than one member.

Signaling, in particular control signaling, may have a duration (in time domain, also referred to as length of time domain extension) and/or frequency domain extension. The duration may correspond to one or more (e.g., an integer number of) symbols and/or allocation units. Reference signaling associated to and/or included in control signaling may allow and/or be intended for channel estimation and/or demodulation and/or extraction of the control signaling or control information represented by the control signaling.

There is also described a program product comprising instructions causing processing circuitry to control and/or perform a method as described herein. Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise:

FIG. 8, showing an exemplary (e.g., receiving) radio node; and

FIG. 9, showing another exemplary (e.g., transmitting) radio node.

DETAILED DESCRIPTION

Figure 1:
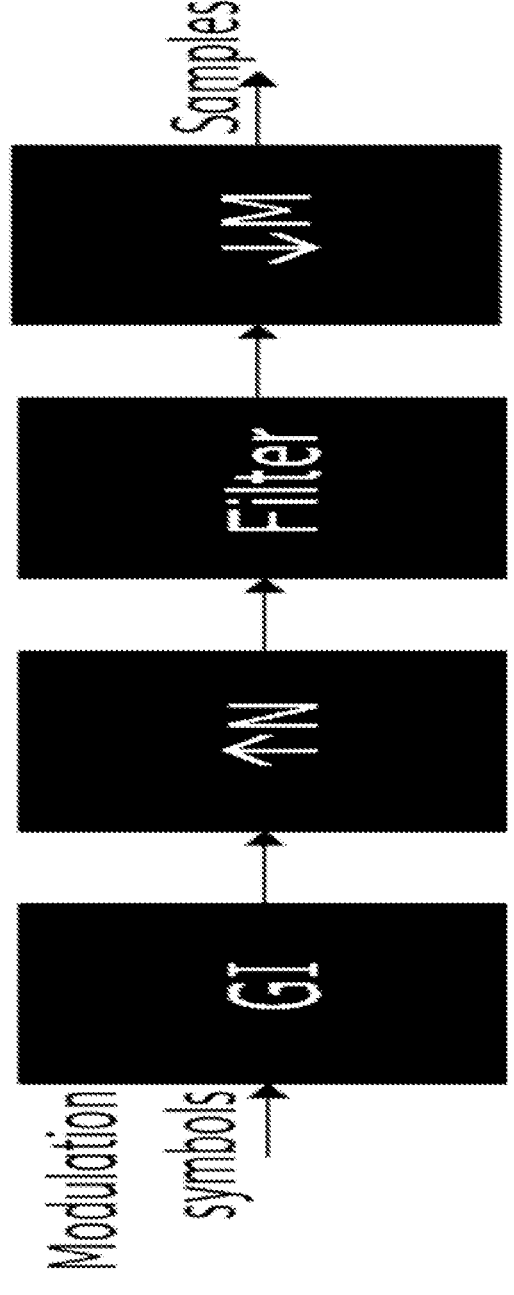
FIG. 1, showing an exemplary transmitting modulation scheme.

In the following, a wireless device or UE may be used as example for a receiving radio node; a base station or network node may be used as an example for a transmitting radio node. It is noted that the exemplary terms may be replace by the more general terms.

Mobile broadband will continue to drive demand for big overall traffic capacity and huge achievable end-user data rates in the wireless access network. Several scenarios in the future will require data rates of up to 10 Gbps in local areas. Demand for very high system capacity and very high end-user date rates can for example be met by networks with distances between access nodes ranging from a few meters in indoor deployments up to roughly 50 m in outdoor deployments, i.e. with an infrastructure density considerably higher than the densest networks of today.

In 3GPP Rel-15, a 5G system referred as New Radio (NR) was specified. NR is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive bands, NR systems are currently being extended expected to operate on unlicensed bands. The NR system specifications currently address two frequency ranges (FR1 and FR2). To support ever growing mobile traffic, further extension of the NR system to support spectrum higher than 5.26 GHz is expected in the near future.

TABLE 1

| Frequency ranges supported by NR | |
| --- | --- |
| Frequency range designation | Corresponding frequency range |
| FR1 | 410 MHz-7125 MHz |
| FR2 | 24250 MHz-52600 MHz |

The downlink transmission waveform in NR is conventional OFDM using a cyclic prefix. The uplink transmission waveform is conventional OFDM using a cyclic prefix with a transform precoding function performing DFT spreading that can be disabled or enabled. Multiple numerologies are supported in NR. A numerology is defined by sub-carrier spacing and CP overhead. Multiple subcarrier spacings (SCS) can be derived by scaling a basic subcarrier spacing by an integer $2^{\mu}$. The numerology used can be selected independently of the frequency band although it is assumed not to use a very small subcarrier spacing at very high carrier frequencies. Flexible network and UE channel bandwidths are supported. The supported transmission numerologies in NR are summarized table 2.

TABLE 2

| | NR numerologies | | | |
| --- | --- | --- | --- | --- |
| $\mu$ | $\Delta f = 2^{\mu} \cdot 15$ [kHz] | Cyclic prefix | Supported for data | Supported for synch |
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

From a RAN1 specification perspective, maximum channel bandwidth per NR carrier is 400 MHz in Rel-15. At least for single numerology case, candidates of the maximum number of subcarriers per NR carrier is 3300 in Rel-15 from RAN1 specification perspective.

Downlink and uplink transmissions are organized into frames with 10 ms duration, consisting of ten 1 ms subframes. Each frame is divided into two equally-sized halfframes of five subframes each. The slot duration is 14 symbols with Normal CP and 12 symbols with Extended CP, and scales in time as a function of the used sub-carrier spacing so that there is always an integer number of slots in a subframe. More specifically, the number of slots per subframe is $2^{\mu}$.

NR downlink physical resources within a slot can thus be seen as a time-frequency grid, where each resource element corresponds to one OFDM subcarrier during one OFDM symbol interval. A resource block may be defined as 12 consecutive subcarriers in the frequency domain. The uplink subframe has the same subcarrier spacing as the downlink and the same number of SC-FDMA symbols in the time domain as OFDM symbols in the downlink (if using SC-FDMA).

In NR, downlink control information (DCI) is received over the physical layer downlink control channel (PDCCH). The PDCCH may carry DCI in messages with different formats. DCI format 0_0 and 0_1 are DCI messages used to convey uplink grants (scheduling grants) to the UE for transmission of the physical layer data channel in the uplink (PUSCH) and DCI format 1_0 and 1_1 are used to convey downlink grants (scheduling assignments) for transmission of the physical layer data channel on the downlink (PDSCH). Other DCI formats (2_0, 2_1, 2_2 and 2_3) are used for other purposes such as transmission of slot format information, reserved resources, transmit power control information, etc.

A PDCCH candidate is searched within a common or UE-specific search space which is mapped to a set of time and frequency resources referred to as a control resource set (CORESET) instance. The search spaces within which PDCCH candidates must be monitored are configured to the UE via radio resource control (RRC) signaling. A monitoring periodicity is also configured for different search space sets. A CORESET is defined by the frequency domain location and size as well as the time domain size. A CORESET in NR can be 1, 2 or 3 OFDM symbols in duration. The smallest unit used for defining CORESETs is a Resource Element Group (REG) which is defined as spanning 12 subcarriers×1 OFDM symbol in frequency and time. Resource-element groups within a control-resource set are numbered in increasing order in a time-first manner, starting with 0 for the first OFDM symbol and the lowest-numbered resource block in the control resource set. As a result, though different PDCCHs can occupy different amount of frequency domain resources, all PDCCHs in a CORESET have the same duration as the duration of the CORESET.

Each REG may contain demodulation reference signals (DM-RS) to aid in the estimation of the radio channel over which that REG was transmitted (assuming transmission of DCI in a REG). When transmitting the PDCCH, a precoder could be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET may be indicated to the UE. The UE may assume that any precoder used for the transmission of the PDCCH is the same for all the REGs in the REG bundle. A REG bundle may consist of 2, 3 or 6 REGs.

A control channel element (CCE) may consist of 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

PDCCHs targeting different coverage ranges may be designed based on assigning different amounts of resources like frequency domain resources to the PDCCHs. A PDCCH candidate may span 1, 2, 4, 8 or 16 CCEs, and the number of aggregated CCEs used is referred to as the aggregation level for the PDCCH candidate. A hashing function is used to determine the CCEs corresponding to PDCCH candidates that a UE must monitor within a search space set. An exemplary set of PDCCH candidates in a CORESET may for example comprise 32 available CCEs. Hashing may be done differently for different UEs and/or in different slots, so that the CCEs used by the UEs are randomized and the probability of collisions between multiple UEs for which PDCCH messages are included in a CORESET is reduced.

Blind decoding of potential PDCCH transmissions is attempted by the UE in each of the configured PDCCH candidates within a slot. In any particular slot, the UE may be configured to monitor multiple PDCCH candidates in multiple search spaces which may be mapped to one or more CORESETs. PDCCH candidates may need to be monitored multiple times in a slot, once every slot, or once in multiple of slots. The maximum number of PDCCH candidates that can be monitored by a UE for a carrier within a slot are summarized in table 3. The complexity incurred at the UE to do this depends on the number of CCEs which need to be processed to test all the candidates in the CORESET. Channel estimation is a key contributor to the complexity incurred by the UE. The maximum number of CCEs of channel estimation supported by the UE for a carrier within a slot are also indicated in table 3.

TABLE 3

| Maximum number of PDCCH candidates and maximum number of CCE for channel estimation within a slot for a carrier. | | | | |
| --- | --- | --- | --- | --- |
| SCS | 15 kHz | 30 kHz | 60 kHz | 120 kHz |
| Max # of candidates | 44 | 36 | 22 | 20 |
| Max # of CCE estimation | 56 | 56 | 48 | 32 |

PA (power amplifier) efficiency at higher frequency is expected to degrade. At higher frequencies, and especially in millimeter wave (mmWave) frequencies, output power per transistor as well as power added efficiency may decrease. A waveform with high power back-off to support EVM and out-of-band emission requirements could dramatically reduce PA efficiency even further. Low PAPR waveforms designed to minimize PA backoff and maximize efficiency may be considered.

Given the high data rate and high sampling rates the system is expected to operate at, the complexity and performance tradeoff for waveform generation/modulation and reception/demodulation should be considered. A higher Tx DAC effective number of bits (ENOB) is required to accommodate higher PAPR, and extra oversampling in the baseband DSP, and Tx DAC may be needed to accommodate wider channel bandwidth. All of these are impacted by waveform, and therefore should be carefully evaluated.

Carrier frequency offset and phase noise is much higher in spectrum beyond 52.6 GHz because of imperfections of PAs and crystal oscillators are more severe than that of lower bands. In addition, Doppler shift/spread is also larger with the carrier frequency increasing. As a result, robustness on frequency offset and phase noise for systems operating on bands above 52.6 GHz may be particularly important. Increasing the subcarrier spacing for a CP-OFDM waveform to better cope with increased phase noise could be investigated. For other potential waveforms, impact from phase noise and ability to robustly handle phase noise should be investigated.

One candidate of the waveform (e.g., for downlink) exhibiting low PAPR properties is the DFTS-OFDM waveform that is currently being used in NR uplink, which may ameliorate PAPR issues for the downlink in the high frequency bands.

Another candidate waveform falls under the general categories of single carrier (SC) modulation. FIG. 1 shows an exemplary scheme for a transmitter block diagram providing SC modulation. The guard interval (GI) may contain cyclic prefix of the input modulation symbol sequence, a sequence known to both transmitter and receiver, or zero power symbols to separate consecutive blocks of modulation symbols. After the GI insertion, the sequence is up-sampled ($\uparrow$N), filtered and down-sampled ($\downarrow$M) to the target sampling rate for transmission.

Figure 2:
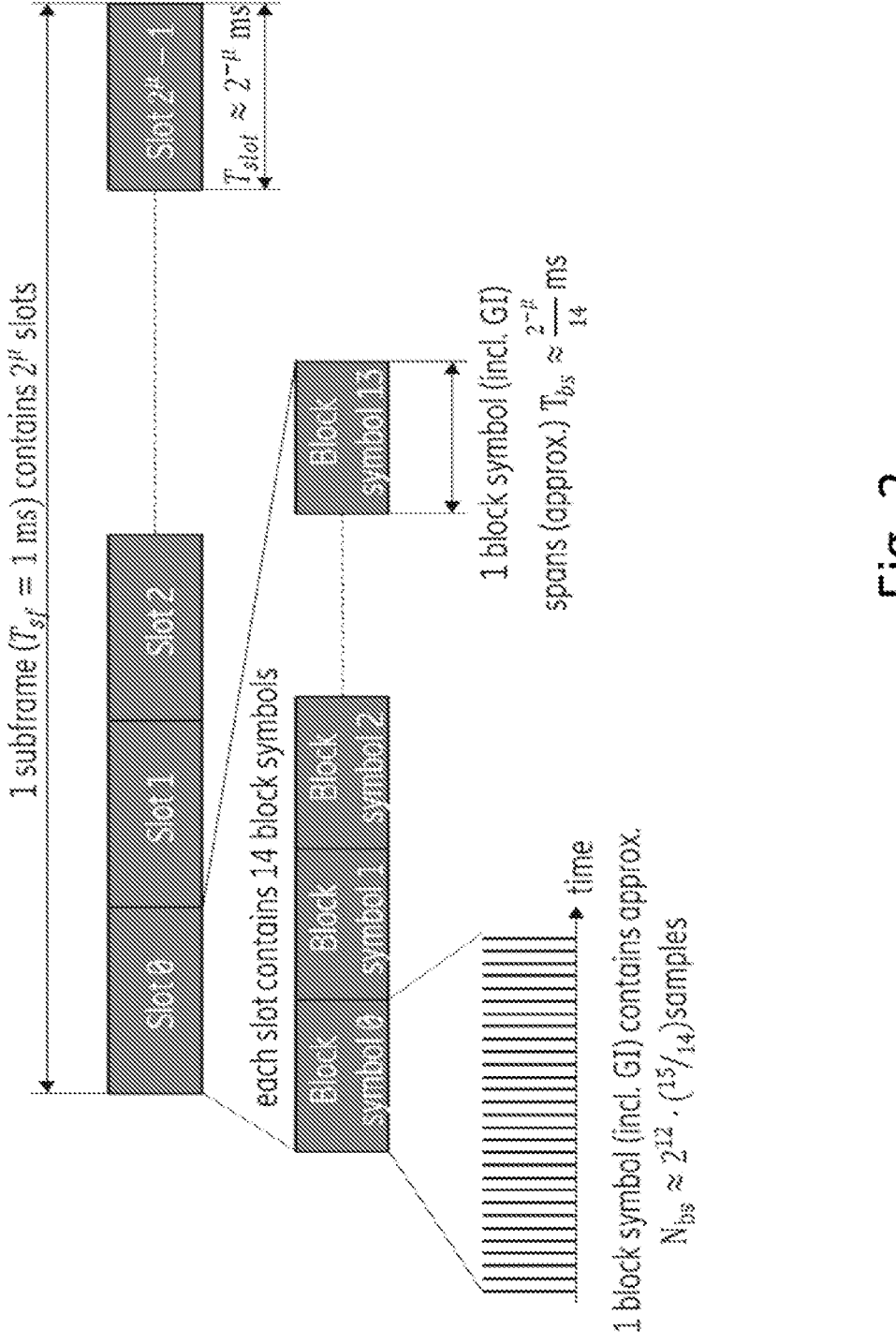
FIG. 2, showing an exemplary timing structure.

For any of the waveform candidates under consideration for the higher frequency bands (including the DFTS-OFDM and SC waveforms discussed in the above), an exemplary frame structure is shown in FIG. 2. In the illustration, samples of the modulation symbols generated for example as indicated in FIG. 1 or with a SC-FDMA-based scheme are organized in block symbols (or allocation units). For the OFDM and the DFTS-OFDM waveforms, such a block symbol may be referred to as an OFDM symbol. For ease of presentation and specification convention, such block symbol may also be referred to as an OFDM symbol for a SC waveform even when no DFT operation is involved in said SC waveform transmitter.

The frequency bands above 52.6 GHz may comprise various combinations of

Primary access by a mobile system

Secondary access by a mobile system

License-exempt access by a mobile system

Regulatory regimes in different parts of the world may impose different use restriction and requirements to protect other adjacent (e.g., non-mobile) systems.

Total output power and output power spectral density (PSD) may be individually or both imposed by applicable regulations in different regulatory regions. For instance, the current Europe regulation for 57-66 GHz is that the maximum mean EIRP is 13 dBm per MHz and the max mean EIRP is 40 dBm. As another example, the US regulation for 57-71 GHz sets the maximum mean EIRP to 40 dBm, which can be used with a bandwidth of at least 100 MHz. The US regulation for 71-76 and 81-86 GHz is the maximum EIRP is 55 dBm and the maximum power spectral density is 21.76 dBm per 100 MHz.

Furthermore, radio signals at higher frequency bands suffer more attenuation in propagation. The path loss is proportional to the second order of the carrier frequency. As discussed in previous paragraphs, devices at such high frequency bands have limitation regarding generating high output power. Based on a survey of various device specs, it can be observed that the available power decreases roughly proportional to the carrier frequency. Taking both factors into account, one can expect the received power for high frequency band signals to scale inversely with the third order of the carrier frequency relative to a lower frequency band signal at the same distance from the transmitters. For instance, one can expect the received power for a 60 GHz band signal to be roughly 30 dB lower than a 6 GHz band signal at the same distance from the transmitter. To combat such severe losses of signal power, many different solutions may be needed to be designed and incorporated together.

Due to severe power and power spectral density limitations, control channels for high frequency bands may be adapted to balance the coherent combining gains over longer transmission duration and the frequency diversity gains over wider bandwidth.

Similar to lower band NR, UEs will need to perform blind decoding to search for the PDCCH sent by the base station, since the UEs do not know what aggregation levels are used by the base station. Performing channel estimation is one of the first function toward decoding the candidate PDCCH. For Rel-15 NR, UEs are capable of performing channel estimation on 56, 48 and 32 CCEs for 30, 60 and 120 kHz sub-carrier spacings, respectively. For high frequency bands using sub-carrier spacing of 960 kHz or higher, the number of CCEs that can be estimated by the UE during the PDCCH candidate search will be severely limited. Using $62.6 \times 2^{-0.32\mu}$ as an estimate for the number of CCEs supported by the UE (which is optimized to minimize the mean absolute deviation from the current supported number of CCEs), the number of CCEs may be as low as 16, 13 and 10 for 960, 1920 and 3840 kHz sub-carrier spacings, respectively.

In the LTE and NR systems, a PDCCH may be limited to carry one DL or one UL scheduling control information. For the high frequency band NR system, it is possible to follow such an approach. For instance, the base station can transmit to the UE a first PDCCH carrying the UL scheduling information which is followed by a second PDCCH carrying the DL scheduling information. However, the existing approach may have the following drawbacks when applied directly for the high frequency band systems. By sending two independent PDCCHs, the UE may need to perform channel estimation on double amount of CCEs. For a PDCCH of a certain duration, the optimal appropriation of the resource between DM-RS and coded payloads may be needed to be determined systematically.

There are proposed approaches providing improved control channel coverage, in particular for high frequency systems. For any of the waveform candidates under consideration for the higher frequency bands (including the DFTS-OFDM and SC waveforms discussed in the above), a block of samples of the modulation symbols may be generally referred to as constituting an OFDM symbol (even when no DFT operation is involved in the transmitter), or may be referred to as block symbol or allocation unit. A resource element group (REG) may be considered to comprise, or consist of, 12 subcarriers*1 OFDM symbol (assuming a waveform utilising subcarriers, otherwise the frequency extension may correspond to the transmission bandwidth). Sometimes, this may be loosely referred to as a resource block (RB) or physical resource block (PRB) or common resource block (CRB). A REG bundle may comprise an integer number, e.g. either 2, 3, or 6, contiguous (in frequency) REGs. A REG bundle may be considered to define the precoder granularity and/or interleaving granularity for the resources in a CORESET. A CCE may be defined as 6 REGs. Sometimes, this is loosely referred to as 6 RBs/PRBs/CRBs. However, specific numbers are used to illustrate possible approaches; different numbers and sizes may be used, e.g. for different waveforms and/or high-frequency carriers.

There may be considered PDCCH aggregation levels with different duration and bandwidth combinations; each PDCCH aggregation level may represent a candidate for control signaling out of a set of control signalings and/or may represent a signaling characteristic from a set of signaling characteristics.

Given the limited transmit and received signal powers, PDCCHs targeting different coverage ranges have different durations. Longer PDCCH durations allow the signal to combine coherently over time to accumulate more energy.

Alternatively, or additionally, PDCCHs of different durations may occupy different amount of frequency resources. Given the limited transmit and received signal powers, spreading the power over more frequency resource may allow the use of lower coding rates, but can impact the channel estimation accuracy. With inaccurate channel estimates, performance will degrade since signals are not correctly combined. Hence, an optimal size of frequency resources can be selected for a PDCCH of a certain duration to achieve best performance.

As one nonlimiting exemplary shown in table 4, a PDCCH in a CORESET or search space may have a different durations, e.g. of either 2, 4, 7 or 14 OFDM symbols or allocation units. Thus, different amounts of energy can be accumulated to combat noise and interference. Furthermore, different amounts of frequency domain resources may be used in conjunction with different durations for different PDCCHs. Combinations of PDCCH bandwidths and durations of different aggregation levels may be specified in the network's protocol descriptions.

Here, following the convention of LTE and NR, a PDCCH of a higher aggregation level has better coverage than a PDCCH of lower aggregation level. That is, for instance, aggregation level D in table 4 corresponds to a higher aggregation level than aggregation level A since the former can withstand more coupling loss than the later.

TABLE 4

Exemplary high frequency band PDCCHs targeting different coverage ranges for 960 kHz sub-carrier spacing in a 60 GHz band.

| PDCCH aggregation level | Duration [OS] | Bandwidth [MHz] | Max coupling loss [dB] |
|---|---|---|---|
| Aggregation level A | 2 | 553 | 118.0 |
| Aggregation level B | 4 | 276 | 121.0 |
| Aggregation level C | 7 | 138 | 122.5 |
| Aggregation level D | 14 | 138 | 124.5 |

Alternatively, or additionally, PDCCH aggregation levels with different duration and bandwidth combinations under PSD limit may be considered. In certain regulatory regimes, transmit power spectral density (PSD) is regulated in addition to total transmit power. Under such PSD limit, a device will not be able transmit at higher power without spreading the signal over wider bandwidth. The bandwidth and duration combination of a PDCCH may be jointly defined, e.g. with a minimum bandwidth. Said minimum bandwidth may depend on one or more of (1) the maximum PSD set by regulation, (2) maximum transmit power set by regulation, (3) and/or device's maximum transmit power capability.

Combinations of PDCCH bandwidths and durations of different aggregation levels may be provided and/or configured and/or indicated by a network coordination node, for example a radio node or higher layer node. One nonlimiting example for a network coordination node is a gNB or eNB in 3GPP NR or LTE networks. Another nonlimiting example of network coordination node is an access point device in IEEE 802.11 networks.

Combinations of PDCCH bandwidths and durations of different aggregation levels may be broadcast by the network, e.g. a network coordination node. One nonlimiting example of such broadcast is the system information block (SIB) signaling in an NR network. In the case where said broadcast signal is scheduled by a PDCCH (e.g., scheduling a broadcast data signaling, in particular on a PDSCH or PSSCH), the bandwidth and duration of said scheduling PDCCH may be specified in the network's protocol descriptions.

For a wireless communication device operating on more than one communication carrier (e.g., one primary carrier and at least one secondary carrier, for example), the combinations of PDCCH bandwidths and durations of different aggregation levels for a secondary carrier can be provided to the UE via higher layer configuration. One nonlimiting example of such higher layer configuration is the radio resource control (RRC) layer signaling, or MAC layer signaling.

Alternatively, or additionally, PDCCH candidates with nested DM-RS locations may be considered. To maintain low PAPR characteristic in the transmission signals, demodulation reference symbols (DM-RS) may be separated from the coded modulation symbols of the control information (PDCCH or DCI) into different block symbol or symbol blocks. For instance, DMRS may be carried in the first symbol block or block symbol, and coded control information can be carried in the second symbol block or block symbol of a length-2 PDCCH.

Figure 3:
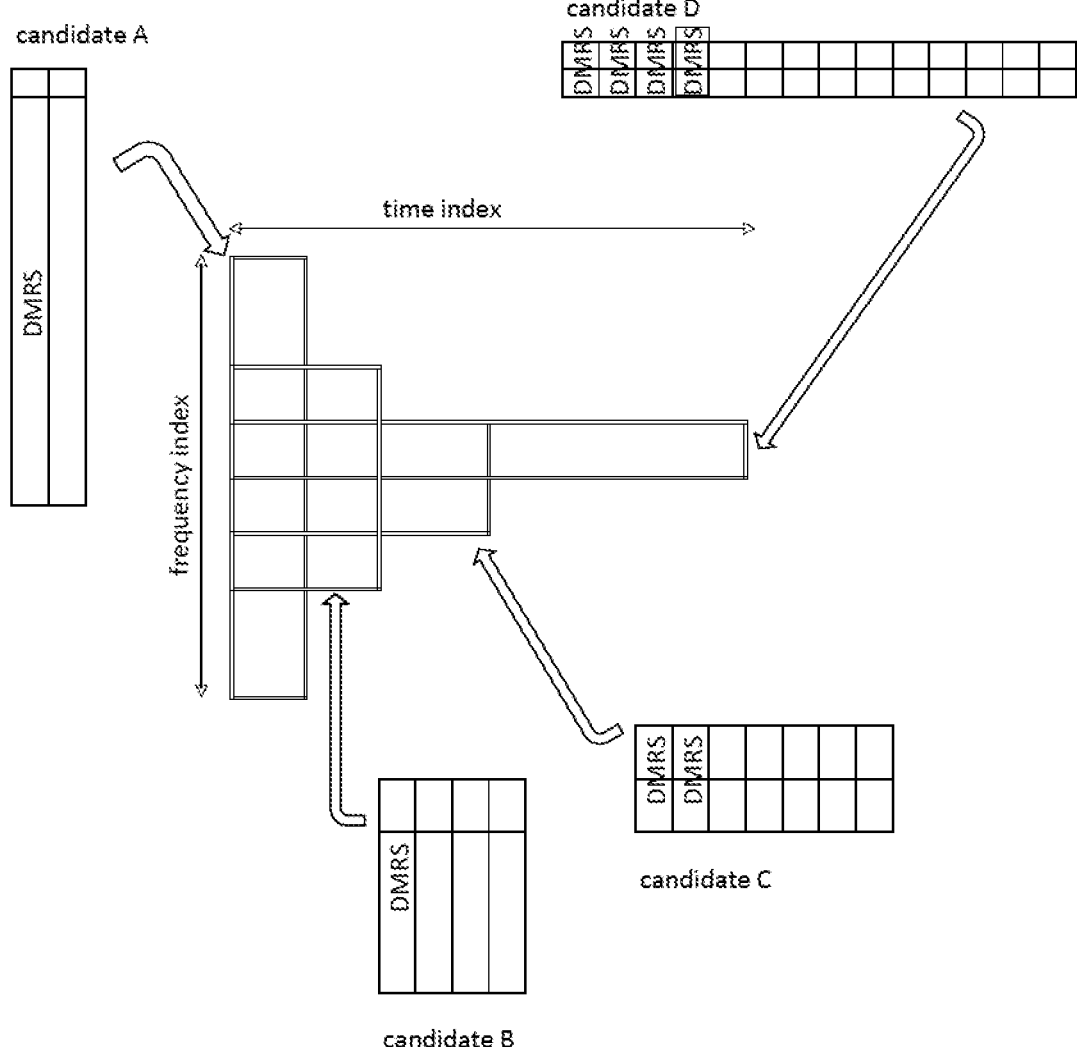
FIG. 3, showing an exemplary set of control signalings and/or DMRS.
Figure 4:
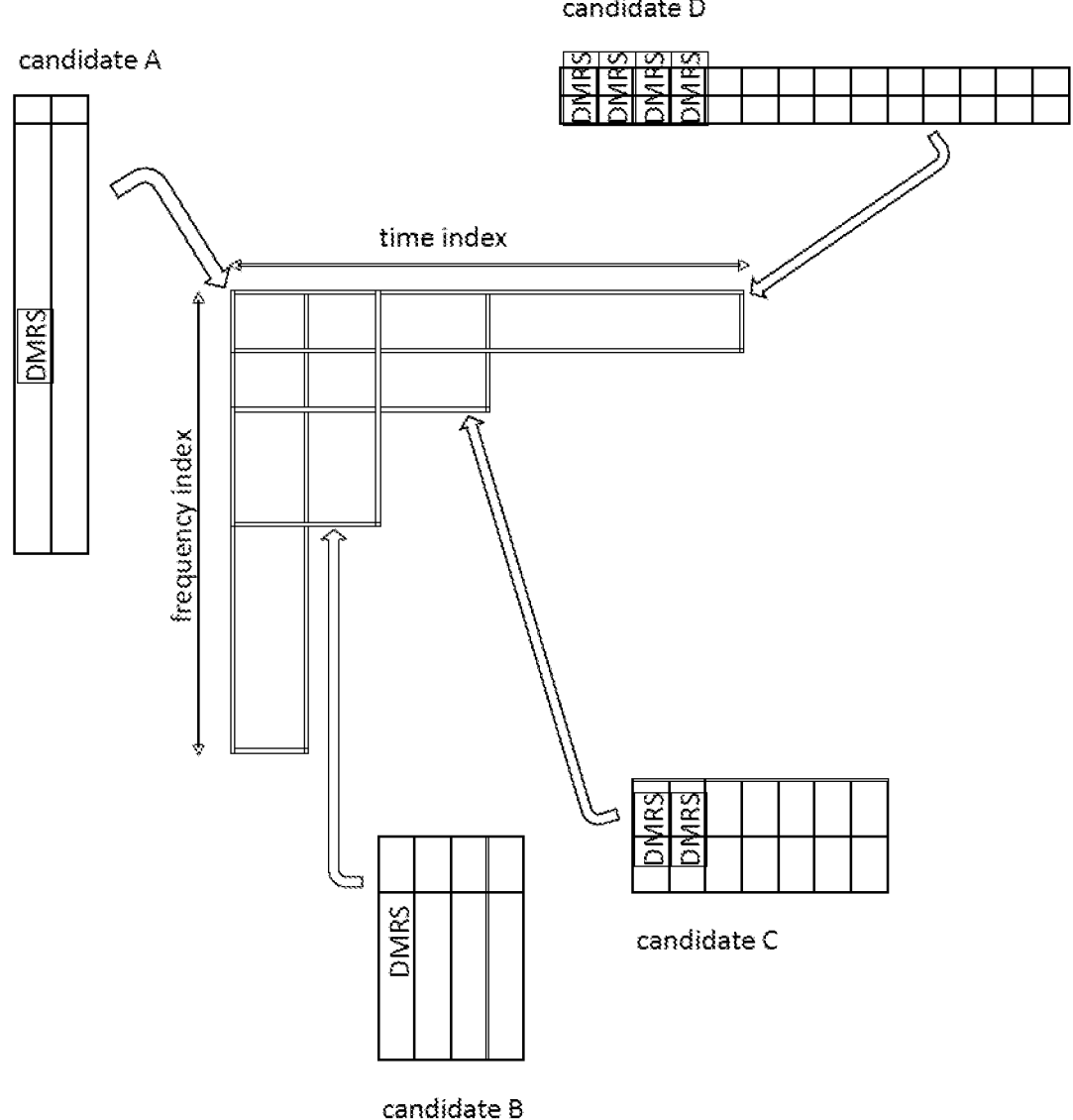
FIG. 4, showing a further exemplary set of control signalings and/or DMRS.

Similar to lower band NR, UEs will need to perform blind decoding to search for the PDCCH sent by the base station since the UEs do not know what aggregation levels are used by the base station. Performing channel estimation is one of the first function toward decoding the candidate PDCCH. For Rel-15 NR, UEs are capable of performing channel estimation on 56, 48 and 32 CCEs for 30, 60 and 120 kHz sub-carrier spacings, respectively. For high frequency bands using sub-carrier spacing of 960 kHz or higher, the number of CCEs that can be estimated by the UE during the PDCCH candidate search will be severely limited. The DM-RS locations of different PDCCH candidates at different aggregation levels may be nested, e.g. such that a UE (or other wireless device) can reuse channel estimation performed for one aggregation level toward the processing of another aggregation level. Nonlimiting exemplary placements of candidate PDCCHs are illustrated in FIGS. 3 and 4. The frequency resource used by a PDCCH candidate of a higher aggregation level may be a subset of that used by a PDCCH candidate of a lower aggregation level. The overlapping frequency resources (and/or time resource/s) used by PDCCHs of different aggregation levels may start at the same frequency location as shown in FIG. 4, or at different frequency locations as shown in FIG. 3. Such PDCCH candidate placement may limit the number of CCEs to estimate for a receiving device like a wireless device. After receiving the first symbol block or block symbol or allocation unit, the UE may estimate the channel response first on the resource corresponding the PDCCH candidate with narrowest bandwidth. The UE may then gradually extend the estimated channel responses to PDCCH candidates with wider bandwidths (e.g., assuming it does not identify a valid PDCCH candidate).

In the LTE and NR systems, a PDCCH is limited to carry one DL or one UL scheduling control information. For the high frequency band NR system, it is possible to follow such an approach. For instance, the base station can transmit to the UE a first PDCCH carrying the UL scheduling information which is followed by a second PDCCH carrying the DL scheduling information.

However, the existing approach may have the following drawbacks when applied directly for the high frequency band systems. By sending two independent PDCCHs, the UE may need to perform channel estimation on double amount of CCEs. Furthermore, if both DCIs are combined and encoded together, better coding gains may be obtained especially if the DM-RS overhead can be reduced at the same time.

Hence, multiple control information or messages targeting the same UE may be concatenated. The combined control information can be then processed using existing PDCCH encoding, modulation and transmission procedures. In general, a control information message representing a scheduling grant and a scheduling assignment may be considered, e.g. including scheduling information pertaining to data signaling to be received by the receiver of the control information message and scheduling data signaling to be transmitted by this receiver, e.g. on different time and/or frequency resources, e.g. in different allocation units.

As one nonlimiting example, using two length-2 PDCCHs to carry two DCIs to a UE according to current NR approach will have two symbol blocks or block symbols or allocation units carrying DM-RS and one each to carry each of the coded DCI. Instead, a single length-4 PDCCH can be used to carry both DCIs. In this case, only one symbol block or block symbol or allocation unit may be used to carry DM-RS, while three may be used to carry coded DCI. As result, the new approach may achieve link performance advantage of 1.5 dB. Leftover bits or resources may for example be used for additional or improved coding, e.g.

FEC or error correction coding, and/or for repetition of information bits or coded bits.

In general, the number and/or location of DM-RS symbol block/s (and/or allocation unit/s or modulation symbols) for a given PDCCH duration may be considered. A demodulation reference signal (DM-RS) (e.g., represented by a modulation symbol or a symbol or signal of a sequence of DMRS symbols or signals) may in general used by the receiver to estimate the channel associated with a physical channel for demodulation. Locations and number of DM-RS symbols are critical players in DM-RS design. Given a PDCCH duration, reducing the number of DM-RSs (or DM-RS overhead) results in lower coding rates, but can impact channel estimation accuracy negatively. According to the teaching of the embodiment, there is an optimal number of DM-RS for a given PDCCH duration. An optimised number of DM-RS can be obtained based on and/or by a function of the number of OFDM symbols (or block symbols or allocation units), e.g. divided by a constant. One nonlimiting example of the constant is four. One nonlimiting example of the function is a ceiling function. Another nonlimiting example of the function is a floor function.

Location of DM-RS symbols may be relevant. Two exemplary structures may be considered for DM-RS symbols locations. First, all DM-RS symbols may be transmitted at the beginning of the slot (or allocation unit, or group of allocation units), which enables the early estimation of the channel. Second, DM-RS may follow a comb pilot structure, which is beneficial for efficient, high-performance channel estimation. At the same time, preserving the same structure when frequency hopping may be enabled.

The core idea of the invention is to design reference pilot sequences for candidate PDCCHs of different aggregation levels in such a way that facilitates computation sharing during channel estimation at the receiver. In particular, the reference pilot sequence of one aggregation level is chosen as a subsequence of the reference pilot sequence of another aggregation level, through, for example, decimation or truncation.

The core idea of the invention is to design reference pilot sequences for candidate PDCCHs of different aggregation levels in such a way that facilitates computation sharing during channel estimation at the receiver. In particular, the reference pilot sequence of one aggregation level is chosen as a subsequence of the reference pilot sequence of another aggregation level, through, for example, decimation or truncation.

In general, nested DM-RS sequence designs for the DFTS-OFDM waveform may be considered. In particular, the DMRS locations of different PDCCH candidates at different aggregation levels may be nested such that UE may reuse channel estimation performed for one aggregation level toward the processing of another aggregation level. In order to reap the benefit of reusing computation from one aggregation level to another, the reference pilot sequences used in the different DMRS at different aggregation levels may also be related. Specifically, the reference pilot sequence used in an aggregation level associated with a narrower bandwidth (e.g. with larger aggregation level) may be derived from the pilot sequence used in the aggregation that occupies the largest bandwidth. A pilot sequence may generally be a sequence of modulation symbols or other symbols representing the reference signaling, e.g. DMRS, and/or facilitating channel estimation and/or demodulation of associated signaling, in particular control signaling.

To see how the reference pilot sequence can be designed for different aggregation levels to facilitate computation sharing, it may be considered how a sufficient statistic for estimating channel response is typically computed during channel estimation for DFTS-OFDM. For ease of description, two aggregation levels are considered. The description can easily be generalized to multiple aggregation levels.

A time domain channel estimation is considered by way of example. The time domain received signal vector for each DFTS-OFDM block for a given aggregation level i, for i=1, 2, can typically be modeled as $$y = \begin{bmatrix} y[0] \\ y[1] \\ \vdots \\ y[N-1] \end{bmatrix} = X^{(i)}c + w,$$

where $c=[c_0, c_1, \ldots, c_{L-1}]^T$ denotes the channel response vector, $w=[w[0], w[1], \ldots, w[N-1]]^T$ is the noise vector, $X^{(i)}$ is a N-by-L signal matrix that depends on the choice of the pilot sequence, L is the number of channel taps, and N is the size of IFFT for DFTS-OFDM transmission. Note that the two PDCCH of different aggregation levels may occupy different bandwidths. An estimate $\hat{c}^{(i)}$ of the time-domain channel response c typically has the form $$\hat{c}^{(i)} = (X^{(i),H}X^{(i)}+R)^{-1}X^{(i),H}y,$$

where R denotes a certain regularization matrix (which may possibly be an all-zero matrix). The sufficient statistic for channel estimation is therefore given by the vector $t^{(i)}:=X^{(i),H}y$ for i=1, 2. Shared computation between $t^{(1)}$ and $t^{(2)}$ can be achieved by designing the pilot sequences for the 2 aggregation levels in such a way that the resulting signal matrices $X^{(1)}$ and $X^{(2)}$ for different aggregation levels share some identical elements.

Due to the presence of cyclic prefix, $X^{(i)}$ is a N-by-L column-wise circulant signal matrix in the form:

$$X^{(i)} = [x^{(i)}_{[0]}, x^{(i)}_{[1]}, \ldots, x^{(i)}_{[L-1]}],$$

where the column vector $$x^{(i)}_{[p]}$$

is a cyclic shift of the first column vector $$x^{(i)} := x^{(i)}_{[0]}$$

for p=0, 1, 2, . . . , L−1. Let $M_i$ denote the number of subcarriers assigned for aggregation level i. Without loss of generality, it may be assumed $M_1=rM_2$ for some integer r>1. The first column vector $x^{(i)}$ is related to the pilot sequence or the sequence of pilot symbols $$s^{(i)} = [s^{(i)}_1, s^{(i)}_2, \ldots, s^{(i)}_{M_i-1}]^T$$

as $$x^{(i)} = \begin{bmatrix} x^{(i)}[0] \\ x^{(i)}[1] \\ \vdots \\ x^{(i)}[N-1] \end{bmatrix} = \qquad (1)$$

$$\frac{1}{N} W_N^H J_{k_i,M_i}^H W_{M_i} s^{(i)} = D_{k_i} \underbrace{\left( \frac{1}{N} W_N^H J_{0,M_i}^H \right) W_{M_i} \tilde{D}_{k_i}^{(i),H}}_{F^{(i)}} \tilde{D}_{k_i}^{(i)} s^{(i)} = F^{(i)} \tilde{D}_{k_i}^{(i)} s^{(i)},$$

where $W_{M_i}$ be the FFT precoding matrix of size $M_i \times M_i$ utilized by a typical DFTS-OFDM transmitter for aggregation level $$i, N^{-1} W_N^H$$

be the corresponding N-point IFFT matrix of size $N \times N$ used by the DFTS-OFDM transmitter, $k_i \in \{0, 1, 2, \ldots, N-1\}$ denotes the first subcarrier index occupied by the transmitted signal. $J_{k_i,M_i}[O_{M_i \times k_i}, I_{M_i}, O_{M_i \times (N-k_i-M_i)}]$ denotes a matrix formed by concatenating $k_i$ columns of zeros, an $M_i \times M_i$ identity matrix, and $(N-k_i-M_i)$ columns of zeros, $D_{k_i}$, denotes a diagonal matrix with $\exp\{j2\pi k_i n/N\}$ as the n-th diagonal element, for $n \in \{0, 1, 2, \ldots, N-1\}$, and $$\tilde{D}_{k_i}^{(i)}$$

denotes a diagonal matrix with $\exp\{j2\pi k_i m/M_i\}$ as the m-th diagonal element, for $m \in \{0, 1, 2, \ldots, M_i-1\}$. Let K be the lowest common multiple of N and $M_1$, and let $K=QN=P_1M_1=P_2M_2=rP_1M_2$ for some coprime integers $P_1$ and Q. (Note that when N is a multiple of $M_1$, then Q=1 and $P_1=N/M_1$.)

The signal matrices $X^{(1)}$ and $X^{(2)}$ share some identical elements when $x^{(1)}$ and $x^{(2)}$ share some identical elements (within a constant real-valued scaling factor).

Figure 5:
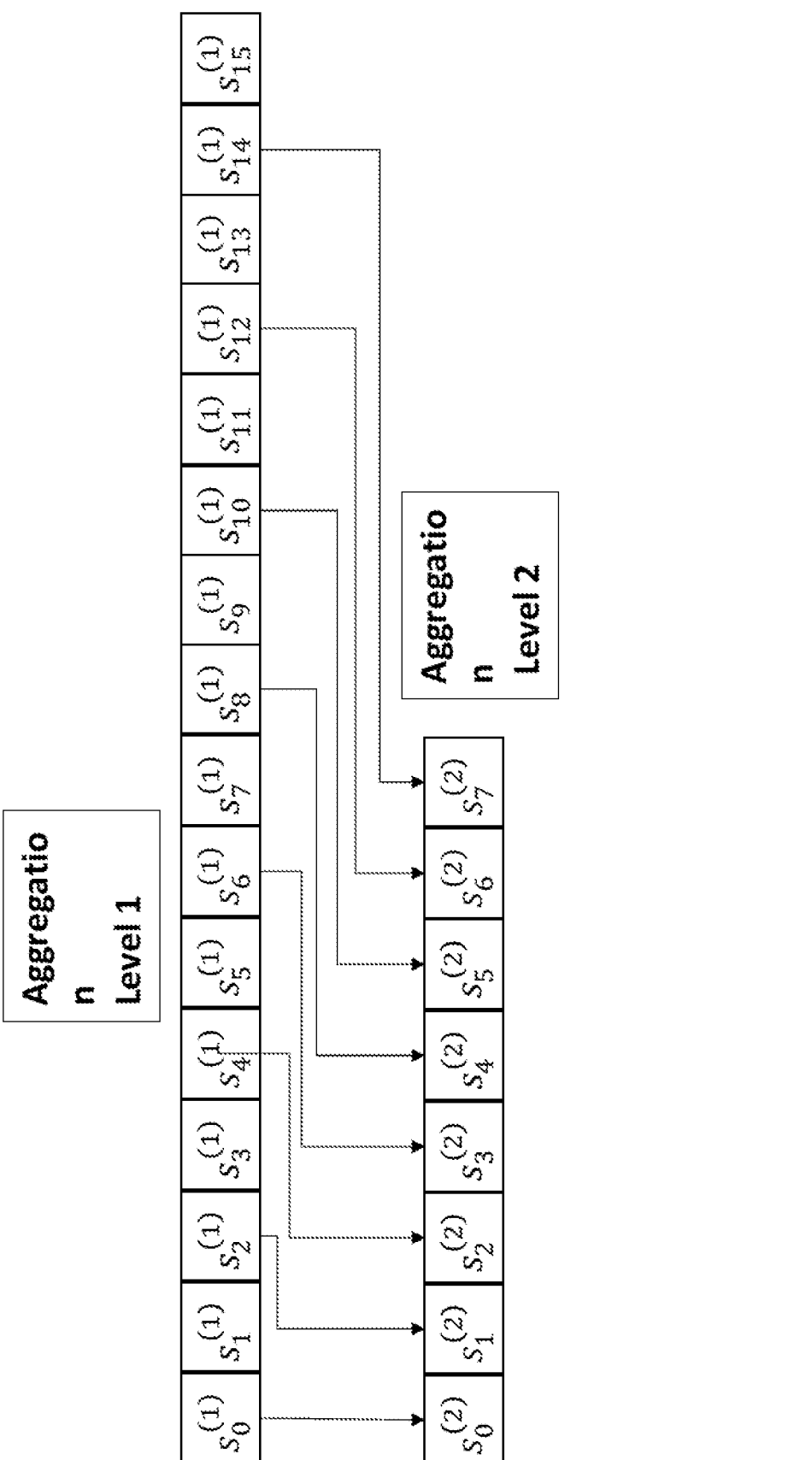
FIG. 5, showing an exemplary approach of determining a subsequence.

In one variant, if the first subcarrier indices for the two aggregation levels are the same (i.e. $k_1=k_2$) as depicted in FIG. 5, the (time-domain) reference symbol sequence $s^{(2)}$ (of length $M_2$) for the PDCCH of a smaller bandwidth transmitted by the transmitter is a decimated version of the reference symbol sequence $s^{(1)}$ of length $M_1$ for the PDCCH of a larger bandwidth transmitted by the transmitter.

A decimated sequence may be formed and/or represented and/or representable by periodically sub-sampling another sequence. As one nonlimiting example, $$s_n^{(2)} = s_{d_2 n}^{(1)},$$

where the n-th value of the $s^{(2)}$ sequence is the $d_2n$-th value of the $s^{(2)}$ sequence and $d_2$ is the decimation factor, as illustrated with $d_2=2$, $M_1=16$, and $M_2=8$.

An exemplary formation of one reference symbol sequence (pilot sequence) for PDCCH of one bandwidth from another reference symbol sequence for PDCCH of a different bandwidth through decimation is generally considered.

As one nonlimiting example, if the (time-domain) pilot symbols $$\{s_n^{(1)}\}$$

for the PDCCH of a larger bandwidth is derived from a Zadoff-Chu sequence of length $N_1$ with parameters $u_1$ and $\alpha_1$ as $$s_n^{(1)} = \begin{cases} e^{\frac{j(\pi u_1(n+1)n+\alpha_1 n)}{N_1}} & \text{if } N_1 \text{ is odd} \\ e^{\frac{j(\pi u_1 n^2 + \alpha_1 n)}{N_1}} & \text{if } N_1 \text{ is even} \end{cases}$$

Then the corresponding pilot symbols $$\{s_n^{(2)}\}$$

for the PDCCH of a smaller bandwidth is related through decimating by a factor of $d_2$ as $$= \begin{cases} e^{\frac{j(\pi u_1(d_2 n+1)d_2 n+\alpha_1 d_2 n)}{N_1}} = e^{\frac{j(\pi u_1(d_2 n+1)n+\alpha_1 n)}{N_1/d_2}} = e^{\frac{j(\pi(u_1 d_2)(n+1)n+(\pi(1-d_2)u_1+\alpha_1)n)}{N_1/d_2}} & \text{if } N_1 \text{ is odd} \\ e^{\frac{j(\pi u_1 d_2^2 n^2 + \alpha_1 d_2 n)}{N_1}} = e^{\frac{j(\pi(u_1 d_2)n^2 + \alpha_1 n)}{N_1/d_2}} & \text{if } N_1 \text{ is even} \end{cases}$$

which may be considered as a Zadoff-Chu sequence of length $N_1/d_2$ with parameters $u_1d_2$ and $\pi(1-d_2)u_1+\alpha_1$.

Figure 6:
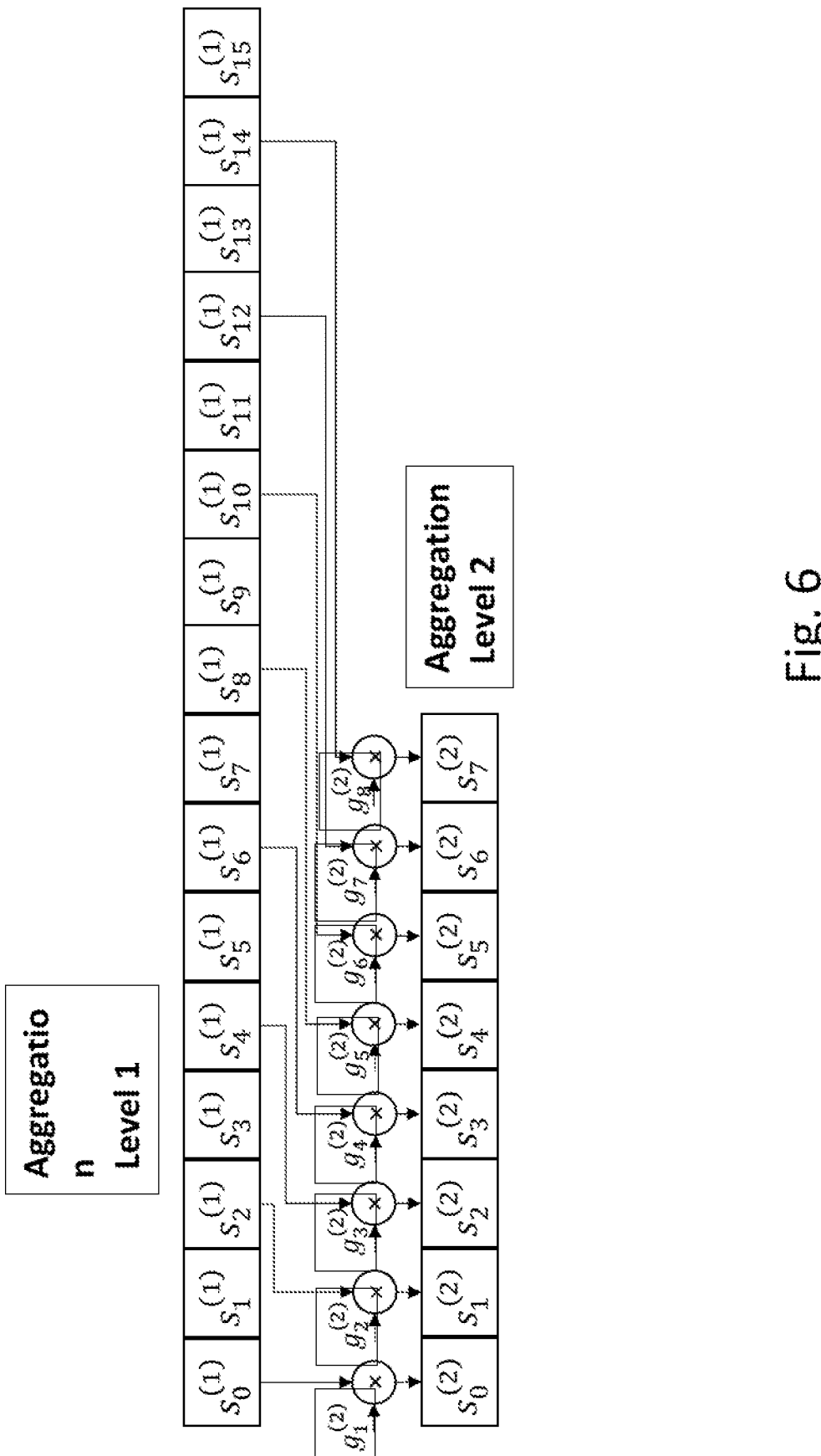
FIG. 6, showing an exemplary approach of determining a subsequence.

In another variant, if the first subcarrier indices for the two aggregation levels are different (i.e. $k_1 \neq k_2$) as depicted in FIG. 6, the (time-domain) reference symbol sequence $s^{(2)}$ (of length $M_2$) for the PDCCH of a smaller bandwidth transmitted by the transmitter may be a phase rotated, decimated version of the reference symbol sequence $s^{(1)}$ of length $M_1$ for the PDCCH of a larger bandwidth transmitted by the transmitter, as illustrated with $d_2=2$, $M_1=16$, and $M_2=8$, where $$g_n^{(2)} = \exp\{j\phi_n^{(i)}\}$$

is a multiplicative factor for phase rotation.

According to a further variant, the phase rotation may depend on the difference between the starting indices of the two different PDCCHs. As one nonlimiting embodiment, $$g_n^{(2)} = \exp\{j2\pi(k_1 - k_2)n/M_2\}.$$

Generally, exemplary formation of one reference symbol sequence for PDCCH of one bandwidth from another reference symbol sequence for PDCCH of a different bandwidth through phase rotation and decimation is considered.

To see that identical elements in $x^{(1)}$ and $x^{(2)}$ can be obtained by selecting the pilot sequence $$\{s_n^{(2)}\}$$

for a higher aggregation level (smaller bandwidth) by decimating the pilot sequence $$\{s_n^{(1)}\}$$

selected for a lower aggregation level (higher bandwidth), one can express the element in the n-th row and the m-th column of the matrix F, as $$[F^{(i)}]_{n,m} = \frac{\exp\left\{\frac{j2\pi n k_i}{N} - \frac{j2\pi m k_i}{M_i}\right\}^{M_i-1}}{N} \sum_{k=0}^{M_i-1} \exp\left\{\frac{j2\pi n k}{N}\right\} \exp\left\{-\frac{j2\pi km}{M_i}\right\} =$$

$$\frac{\exp\left\{\frac{j2\pi k_i(nQ-mP_i)}{K}\right\} \exp\left\{\frac{j2\pi M_i(nQ-mP)}{K}\right\} - 1}{N} \cdot \frac{\exp\left\{\frac{j2\pi M_i(nQ-mP)}{K}\right\} - 1}{\exp\left\{\frac{j2\pi(nQ-mP_i)}{K}\right\} - 1} =$$

$$\frac{M_i}{N} \exp\left\{\frac{j\pi(2k_i+M_i-1)(nQ-mP_i)}{K}\right\} \frac{\operatorname{sinc}\left(\frac{nQ-mP_i}{P_i}\right)}{\operatorname{sinc}\left(\frac{nQ-mP_i}{K}\right)}$$

where sinc $(x)=(\pi x)^{-1} \sin(\pi x)$. Now define $$f^{(i)}[k] \equiv \frac{M_i}{N} \exp\left\{j\frac{\pi(2k_i+M_i-1)}{K}k\right\} \frac{\operatorname{sinc}\left(\frac{k}{P_i}\right)}{\operatorname{sinc}\left(\frac{k}{K}\right)}$$

It follows that the matrix $F^{(i)}$ can expressed in terms of $$\{f^{(i)}[k]\}_{k=0}^{K-1}$$

as $$F^{(i)} = \begin{bmatrix} f^{(i)}[0] & f^{(i)}[-P_i \bmod K] & \cdots & f^{(i)}[-(M_i-1)P_i \bmod K] \\ f^{(i)}[Q] & f^{(i)}[Q-P_i \bmod K] & \cdots & f^{(i)}[Q-(M_i-1)P_i \bmod K] \\ \vdots & \vdots & \ddots & \vdots \\ f^{(i)}[(N-1)Q] & f^{(i)}[(N-1)Q-P_i \bmod K] & \cdots & f^{(i)}[(N-1)Q-(M_i-1)P_i \bmod K] \end{bmatrix}.$$

Note that since $P_2=rP_1$ for some integer $r>1$, $F^{(2)}$ is a submatrix of $F^{(1)}$ as $F^{(2)}$ simply consists of every r-th column of $F^{(1)}$. Since sinc $(x)=0$ whenever x is a non-zero integer, and since $P_2=rP_1$ for some integer $r>1$, all but one element in the n-th row of $F^{(i)}$ are zero for both i=1 and i=2 when nQ is an integer multiple of $P_2$. Hence, from (1), one can see that $x^{(1)}$ and $x^{(2)}$ have identical elements (within a constant real-valued scaling factor) with indices from the set:

$I=\{n \in Z^*: nQ=mP_2$ for some integer $m\}$, where $Z^*=\{0, 1, 2, 3, \dots\}$ is the set of non-zero integers, when $$\tilde{D}_{k_2}^{(2)} s^{(2)}$$

consists of every r-th element of $$\tilde{D}_{k_1}^{(1)} s^{(1)},$$

which means that $$s_n^{(2)} = g_n^{(2)} s_{rn}^{(1)}$$

where $$g_n^{(2)} = \exp\{j2\pi(k_1-k_2)n/M_2\}$$

for n=0, 1, . . . , $M_2$. In this case, the computations of the sufficient statistics $t^{(1)}$ and $t^{(2)}$ can be shared over these identical elements.

Alternatively, or additionally, frequency domain channel estimation may be considered.

According to another variant, channel estimation may be performed in frequency domain based on a transformed received signal vector $Y=W_N y$, where $\Phi_N$ denotes the N=by-N Fast Fourier Transform (FFT) matrix. In this case, the frequency domain received signal vector Y, for a given aggregation level i, where i=1, 2, can be modeled as $$Y = \begin{bmatrix} Y[0] \\ Y[1] \\ \vdots \\ Y[N-1] \end{bmatrix} = W_N y = D(S^{(i)})C + W,$$

where $$S^{(i)} = \left[S_0^{(i)}, S_1^{(i)}, \dots, S_{N-1}^{(i)}\right]^T = W_N x^{(i)}$$

denotes the frequency domain reference sequence, $D(S^{(i)})$ denotes a diagonal matrix with diagonal elements drawn from $S^{(i)}$, $C=[C_0, C_1, \dots, C_{N-1}]$ denotes the frequency-domain channel response, and $W=W_N W$ is the corresponding noise vector. An estimate $\hat{C}$ of the frequency-domain channel response C typically has the form $$\hat{C}^{(i)}=(D(S^{(i)})^H D(S^{(i)})+R)^{-1} D(S^{(i)})^H Y$$

where R denotes a regularization matrix (which may possibly be an all-zero matrix). The sufficient statistic for channel estimation is therefore given by the vector $T^{(i)} := D(S^{(i)})^H Y$ for $i=1, 2$. Shared computation between $T^{(1)}$ and $T^{(2)}$ can be achieved by designing the pilot sequences for the 2 aggregation levels in such a way that the frequency domain reference sequences $S^{(1)}$ and $S^{(2)}$ for different aggregation levels share some identical elements.

The (frequency-domain) reference symbol sequence $S^{(2)}$ (of length $M_2$) for the PDCCH of a smaller bandwidth transmitted by the transmitter may be a truncated version of the reference symbol sequence $S^{(1)}$ of length $M_1$, where $M_1 > M_2$, for the PDCCH of a larger bandwidth transmitted by the transmitter.

Figure 7:
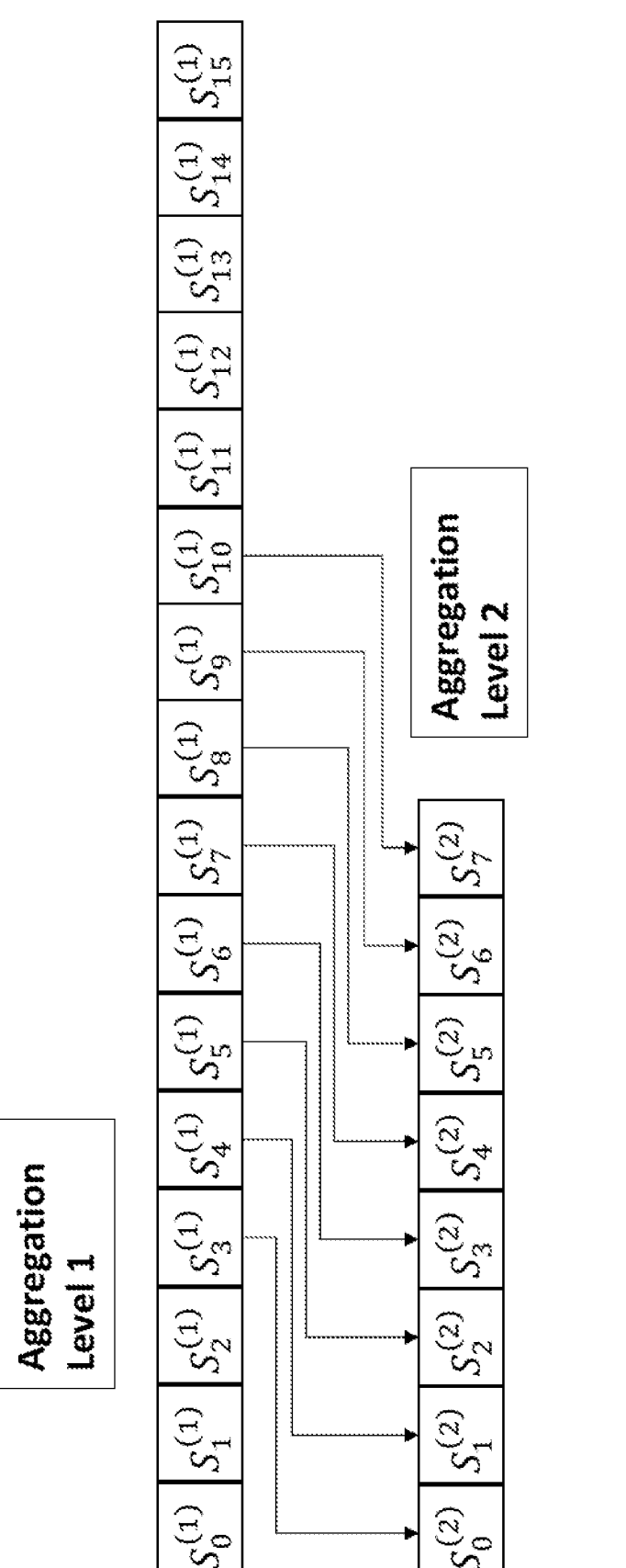
FIG. 7, showing an exemplary approach of determining a subsequence.

A truncated sequence may be formed and/or represented and/or representable by extracting a segment from another sequence. As one nonlimiting example, $$S_k^{(2)} = S_{k+k_2}^{(1)},$$

where the k-th value of the $S^{(2)}$ sequence is the $(k+k_2)$-th value of the $S^{(1)}$ sequence, for $k=0, 1, \ldots, M_2-1$, as illustrated in FIG. 7 with $k_2=3$, $M_1=16$, and $M_2=8$.

Exemplary formation of one reference symbol sequence for PDCCH of one bandwidth from another reference symbol sequence for PDCCH of a different bandwidth through truncation may in general be considered.

As a non-limiting example, if the (frequency-domain) pilot symbols $$\{S_k^{(1)}\}$$

is derived from a Zadoff-Chu sequence of length $N_1$ with parameters $u_1$ and $\alpha_1$ as $$S_n^{(1)} = \begin{cases} e^{\frac{i(\pi u_1 (n+1)n + \alpha_1 n)}{N_1}} & \text{if } N_1 \text{ is odd} \\ e^{\frac{i(\pi u_1 n^2 + \alpha_1 n)}{N_1}} & \text{if } N_1 \text{ is even} \end{cases}$$

for frequency (or subcarrier) indices $k=0, 1, 2, \ldots, M_1-1$. Then the corresponding pilot symbols $$\{S_k^{(2)}\}$$

for aggregation level 2 is related through shortening to a length of $M_2$ such that $$S_k^{(2)} := S_k^{(1)}$$

for $k=k_2, 1, \ldots, k_2+M_2-1$. In other words, the pilot symbols $$\{S_k^{(2)}\}$$

for aggregation level 2 are simply extracted from a segment of the pilot symbols $$\{S_k^{(1)}\}$$

for aggregation level 1 starting at index $k_2$ for a length of $M_2 < M_1$.

In general, on the receiving side (e.g. the receiving radio node), a receiver (1) first may compute and store an intermediate result regarding a sufficient statistic for estimating the (time-domain or frequency-domain) channel response for the PDCCH of one bandwidth, (2) compute a channel estimate using the intermediate result for the PDCCH of that bandwidth, and then (3) compute another channel estimate using the intermediate result for another PDCCH of a different bandwidth.

Figure 8:
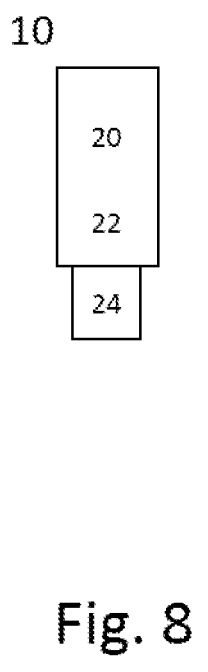

It is generally proposed designing reference pilot sequences for candidate PDCCHs of different aggregation levels so as to facilitate computation sharing during channel estimation at the receiver. In particular, the reference pilot sequence of one aggregation level may be chosen as a subsequence of the reference pilot sequence of another aggregation level, through, for example, decimation or truncation FIG. 8 schematically shows a radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication (which may be within coverage of the cellular network, or out of coverage; and/or may be considered non-cellular communication and/or be associated to a non-cellular wireless communication network). Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 9:
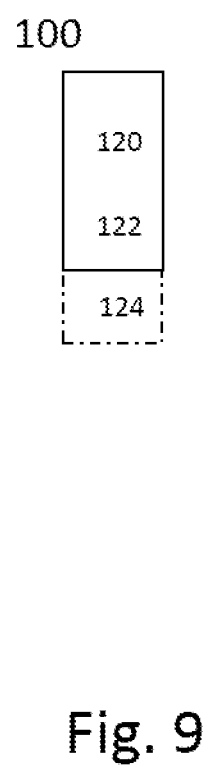

FIG. 9 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification.

Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

In general, a block symbol may represent and/or correspond to an extension in time domain, e.g. a time interval. A block symbol duration (the length of the time interval) may correspond to the duration of an OFDM symbol or a corresponding duration, and/or may be based and/or defined by a subcarrier spacing used (e.g., based on the numerology) or equivalent, and/or may correspond to the duration of a modulation symbol (e.g., for OFDM or similar frequency domain multiplexed types of signaling). It may be considered that a block symbol comprises a plurality of modulation symbols, e.g. based on a subcarrier spacing and/or numerology or equivalent, in particular for time domain multiplexed types (on the symbol level for a single transmitter) of signaling like single-carrier based signaling, e.g. SC-FDE or SC-FDMA (in particular, FDF-SC-FDMA or pulse-shaped SC-FDMA). The number of symbols may be based on and/or defined by the number of subcarrier to be DFTS-spread (for SC-FDMA) and/or be based on a number of FFT samples, e.g. for spreading and/or mapping, and/or equivalent, and/or may be predefined and/or configured or configurable. A block symbol in this context may comprise and/or contain a plurality of individual modulation symbols, which may be for example 1000 or more, or 3000 or more, or 3300 or more. The number of modulation symbols in a block symbol may be based and/or be dependent on a bandwidth scheduled for transmission of signaling in the block symbol. A block symbol and/or a number of block symbols (an integer smaller than 20, e.g. equal to or smaller than 14 or 7 or 4 or 2 or a flexible number) may be a unit (e.g., allocation unit) used or usable or intended e.g. for scheduling and/or allocation of resources, in particular in time domain. To a block symbol (e.g., scheduled or allocated) and/or block symbol group and/or allocation unit, there may be associated a frequency range and/or frequency domain allocation and/or bandwidth allocated for transmission.

An allocation unit, and/or a block symbol, may be associated to a specific (e.g., physical) channel and/or specific type of signaling, for example reference signaling. In some cases, there may be a block symbol associated to a channel that also is associated to a form of reference signaling and/or pilot signaling and/or tracking signaling associated to the channel, for example for timing purposes and/or decoding purposes (such signaling may comprise a low number of modulation symbols and/or resource elements of a block symbol, e.g. less than 10% or less than 5% or less than 1% of the modulation symbols and/or resource elements in a block symbol). To a block symbol, there may be associated resource elements; a resource element may be represented in time/frequency domain, e.g. by the smallest frequency unit carrying or mapped to (e.g., a subcarrier) in frequency domain and the duration of a modulation symbol in time domain. A block symbol may comprise, and/or to a block symbol may be associated, a structure allowing and/or comprising a number of modulation symbols, and/or association to one or more channels (and/or the structure may dependent on the channel the block symbol is associated to and/or is allocated or used for), and/or reference signaling (e.g., as discussed above), and/or one or more guard periods and/or transient periods, and/or one or more affixes (e.g., a prefix and/or suffix and/or one or more infixes (entered inside the block symbol)), in particular a cyclic prefix and/or suffix and/or infix. A cyclic affix may represent a repetition of signaling and/or modulation symbol/s used in the block symbol, with possible slight amendments to the signaling structure of the affix to provide a smooth and/or continuous and/or differentiable connection between affix signaling and signaling of modulation symbols associated to the content of the block symbol (e.g., channel and/or reference signaling structure). In some cases, in particular some OFDM-based waveforms, an affix may be included into a modulation symbol. In other cases, e.g. some single carrier-based waveforms, an affix may be represented by a sequence of modulation symbols within the block symbol. It may be considered that in some cases a block symbol is defined and/or used in the context of the associated structure.

Communicating may comprise transmitting or receiving. It may be considered that communicating like transmitting signaling is based on a SC-FDM based waveform, and/or corresponds to a Frequency Domain Filtered (FDF) DFTS-OFDM waveform. However, the approaches may be applied to a Single Carrier based waveform, e.g. a SC-FDM or SC-FDE-waveform, which may be pulse-shaped/FDF-based. It should be noted that SC-FDM may be considered DFT-spread OFDM, such that SC-FDM and DFTS-OFDM may be used interchangeably. Alternatively, or additionally, the signaling (e.g., first signaling and/or second signaling) and/or beam/s (in particular, the first received beam and/or second received beam) may be based on a waveform with CP or comparable guard time. The received beam and the transmission beam of the first beam pair may have the same (or similar) or different angular and/or spatial extensions; the received beam and the transmission beam of the second beam pair may have the same (or similar) or different angular and/or spatial extensions. It may be considered that the received beam and/or transmission beam of the first and/or second beam pair have angular extension of 20 degrees or less, or 15 degrees or less, or 10 or 5 degrees or less, at least in one of horizontal or vertical direction, or both; different beams may have different angular extensions. An extended guard interval or switching protection interval may have a duration corresponding to essentially or at least N CP (cyclic prefix) durations or equivalent duration, wherein N may be 2, or 3 or 4. An equivalent to a CP duration may represent the CP duration associated to signaling with CP (e.g., SC-FDM-based or OFDM-based) for a waveform without CP with the same or similar symbol time duration as the signaling with CP. Pulse-shaping (and/or performing FDF for) a modulation symbol and/or signaling, e.g. associated to a first subcarrier or bandwidth, may comprise mapping the modulation symbol (and/or the sample associated to it after FFT) to an associated second subcarrier or part of the bandwidth, and/or applying a shaping operation regarding the power and/or amplitude and/or phase of the modulation symbol on the first subcarrier and the second subcarrier, wherein the shaping operation may be according to a shaping function. Pulse-shaping signaling may comprise pulse-shaping one or more symbols; pulse-shaped signaling may in general comprise at least one pulse-shaped symbol. Pulse-shaping may be performed based on a Nyquist-filter. It may be considered that pulse-shaping is performed based on periodically extending a frequency distribution of modulation symbols (and/or associated samples after FFT) over a first number of subcarrier to a larger, second number of subcarriers, wherein a subset of the first number of subcarriers from one end of the frequency distribution is appended at the other end of the first number of subcarriers.

In some variants, communicating may be based on a numerology (which may, e.g., be represented by and/or correspond to and/or indicate a subcarrier spacing and/or symbol time length) and/or an SC-FDM based waveform (including a FDF-DFTS-FDM based waveform) or a single-carrier based waveform. Whether to use pulse-shaping or FDF on a SC-FDM or SC-based waveform may depend on the modulation scheme (e.g., MCS) used. Such waveforms may utilise a cyclic prefix and/or benefit particularly from the described approaches. Communicating may comprise and/or be based on beamforming, e.g. transmission beam-forming and/or reception beamforming, respectively. It may be considered that a beam is produced by performing analog beamforming to provide the beam, e.g. a beam corresponding to a reference beam.

Thus, signaling may be adapted, e.g. based on movement of the communication partner. A beam may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders. In general, a beam may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam is produced by hybrid beamforming, e.g. by analog beamforming performed on a beam representation or beam formed based on digital beamforming. Monitoring and/or performing cell search may be based on reception beamforming, e.g. analog or digital or hybrid reception beamforming. The numerology may determine the length of a symbol time interval and/or the duration of a cyclic prefix. The approaches described herein are particularly suitable to SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal. Communicating may comprise, and/or be based on performing cell search, e.g. for a wireless device or terminal, or may comprise transmitting cell identifying signaling and/or a selection indication, based on which a radio node receiving the selection indication may select a signaling bandwidth from a set of signaling bandwidths for performing cell search.

A beam or beam pair may in general be targeted at one radio node, or a group of radio nodes and/or an area including one or more radio nodes. In many cases, a beam or beam pair may be receiver-specific (e.g., UE-specific), such that only one radio node is served per beam/beam pair. A beam pair switch or switch of received beam (e.g., by using a different reception beam) and/or transmission beam may be performed at a border of a transmission timing structure, e.g. a slot border, or within a slot, for example between symbols Some tuning of radio circuitry, e.g. for receiving and/or transmitting, may be performed. Beam pair switching may comprise switching from a second received beam to a first received beam, and/or from a second transmission beam to a first transmission beam. Switching may comprise inserting a guard period to cover retuning time; however, circuitry may be adapted to switch sufficiently quickly to essentially be instantaneous; this may in particular be the case when digital reception beamforming is used to switch reception beams for switching received beams.

A reference beam may be a beam comprising reference signaling, based on which for example a of beam signaling characteristics may be determined, e.g. measured and/or estimated. A signaling beam may comprise signaling like control signaling and/or data signaling and/or reference signaling. A reference beam may be transmitted by a source or transmitting radio node, in which case one or more beam signaling characteristics may be reported to it from a receiver, e.g. a wireless device. However, in some cases it may be received by the radio node from another radio node or wireless device. In this case, one or more beam signaling characteristics may be determined by the radio node. A signaling beam may be a transmission beam, or a reception beam. A set of signaling characteristics may comprise a plurality of subsets of beam signaling characteristics, each subset pertaining to a different reference beam. Thus, a reference beam may be associated to different beam signaling characteristics.

A beam signaling characteristic, respectively a set of such characteristics, may represent and/or indicate a signal strength and/or signal quality of a beam and/or a delay characteristic and/or be associated with received and/or measured signaling carried on a beam. Beam signaling characteristics and/or delay characteristics may in particular pertain to, and/or indicate, a number and/or list and/or order of beams with best (e.g., lowest mean delay and/or lowest spread/range) timing or delay spread, and/or of strongest and/or best quality beams, e.g. with associated delay spread. A beam signaling characteristic may be based on measurement/s performed on reference signaling carried on the reference beam it pertains to. The measurement/s may be performed by the radio node, or another node or wireless device. The use of reference signaling allows improved accuracy and/or gauging of the measurements. In some cases, a beam and/or beam pair may be represented by a beam identity indication, e.g. a beam or beam pair number. Such an indication may be represented by one or more signaling sequences (e.g., a specific reference signaling sequences or sequences), which may be transmitted on the beam and/or beam pair, and/or a signaling characteristic and/or a resource/s used (e.g., time/frequency and/or code) and/or a specific RNTI (e.g., used for scrambling a CRC for some messages or transmissions) and/or by information provided in signaling, e.g. control signaling and/or system signaling, on the beam and/or beam pair, e.g. encoded and/or provided in an information field or as information element in some form of message of signaling, e.g. DCI and/or MAC and/or RRC signaling.

A reference beam may in general be one of a set of reference beams, the second set of reference beams being associated to the set of signaling beams. The sets being associated may refer to at least one beam of the first set being associated and/or corresponding to the second set (or vice versa), e.g. being based on it, for example by having the same analog or digital beamforming parameters and/or precoder and/or the same shape before analog beamforming, and/or being a modified form thereof, e.g. by performing additional analog beamforming. The set of signaling beams may be referred to as a first set of beams, a set of corresponding reference beams may be referred to as second set of beams.

In some variants, a reference beam and/or reference beams and/or reference signaling may correspond to and/or carry random access signaling, e.g. a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g. based on broadcast information provided by the radio node (the radio node performing the beam selection), e.g. with synchronisation signaling (e.g., SSB block and/or associated thereto). The reference signaling may correspond to synchronisation signaling, e.g. transmitted by the radio node in a plurality of beams. The characteristics may be reported on by a node receiving the synchronisation signaling, e.g. in a random access process, e.g. a msg3 for contention resolution, which may be transmitted on a physical uplink shared channel based on a resource allocation provided by the radio node.

A delay characteristic (which may correspond to delay spread information) and/or a measurement report may represent and/or indicate at least one of mean delay, and/or delay spread, and/or delay distribution, and/or delay spread distribution, and/or delay spread range, and/or relative delay spread, and/or energy (or power) distribution, and/or impulse response to received signaling, and/or the power delay profile of the received signals, and/or power delay profile related parameters of the received signal. A mean delay may represent the mean value and/or an averaged value of the delay spread, which may be weighted or unweighted. A distribution may be distribution over time/delay, e.g. of received power and/or energy of a signal. A range may indicate an interval of the delay spread distribution over time/delay, which may cover a predetermined percentage of the delay spread respective received energy or power, e.g. 50% or more, 75% or more, 90% or more, or 100%. A relative delay spread may indicate a relation to a threshold delay, e.g. of the mean delay, and/or a shift relative to an expected and/or configured timing, e.g. a timing at which the signaling would have been expected based on the scheduling, and/or a relation to a cyclic prefix duration (which may be considered on form of a threshold). Energy distribution or power distribution may pertain to the energy or power received over the time interval of the delay spread. A power delay profile may pertain to representations of the received signals, or the received signals energy/power, across time/delay. Power delay profile related parameters may pertain to metrics computed from the power delay profile. Different values and forms of delay spread information and/or report may be used, allowing a wide range of capabilities. The kind of information represented by a measurement report may be predefined, or be configured or configurable, e.g. with a measurement configuration and/or reference signaling configuration, in particular with higher layer signaling like RRC or MAC signaling and/or physical layer signaling like DCI signaling.

In general, different beam pair may differ in at least one beam; for example, a beam pair using a first received beam and a first transmission beam may be considered to be different from a second beam pair using the first received beam and a second transmission beam. A transmission beam using no precoding and/or beamforming, for example using the natural antenna profile, may be considered as a special form of transmission beam of a transmission beam pair. A beam may be indicated to a radio node by a transmitter with a beam indication and/or a configuration, which for example may indicate beam parameters and/or time/frequency resources associated to the beam and/or a transmission mode and/or antenna profile and/or antenna port and/or precoder associated to the beam. Different beams may be provided with different content, for example different received beams may carry different signaling; however, there may be considered cases in which different beams carry the same signaling, for example the same data signaling and/or reference signaling. The beams may be transmitted by the same node and/or transmission point and/or antenna arrangement, or by different nodes and/or transmission points and/or antenna arrangements.

Communicating utilising a beam pair or a beam may comprise receiving signaling on a received beam (which may be a beam of a beam pair), and/or transmitting signaling on a beam, e.g. a beam of a beam pair. The following terms are to be interpreted from the point of view of the referred radio node: a received beam may be a beam carrying signaling received by the radio node (for reception, the radio node may use a reception beam, e.g. directed to the received beam, or be non-beamformed). A transmission beam may be a beam used by the radio node to transmit signaling. A beam pair may consist of a received beam and a transmission beam. The transmission beam and the received beam of a beam pair may be associated to each and/or correspond to each other, e.g. such that signaling on the received beam and signaling on a transmission beam travel essentially the same path (but in opposite directions), e.g. at least in a stationary or almost stationary condition. It should be noted that the terms "first" and "second" do not necessarily denote an order in time; a second signaling may be received and/or transmitted before, or in some cases simultaneous to, first signaling, or vice versa. The received beam and transmission beam of a beam pair may be on the same carrier or frequency range or bandwidth part, e.g. in a TDD operation; however, variants with FDD may be considered as well. Different beam pairs may operate on the same frequency ranges or carriers or bandwidth parts (e.g., such that transmission beams operate on the same frequency range or carriers or bandwidth part, and received beams on the same frequency range or carriers or bandwidth part (the transmission beam and received beams may be on the same or different ranges or carriers or BWPs). Communicating utilizing a first beam pair and/or first beam may be based on, and/or comprise, switching from the second beam pair or second beam to the first beam pair or first beam for communicating. The switching may be controlled by the network, for example a network node (which may be the source or transmitter of the received beam of the first beam pair and/or second beam pair, or be associated thereto, for example associated transmission points or nodes in dual connectivity). Such controlling may comprise transmitting control signaling, e.g. physical layer signaling and/or higher layer signaling. In some cases, the switching may be performed by the radio node without additional control signaling, for example based on measurements on signal quality and/or signal strength of beam pairs (e.g., of first and second received beams), in particular the first beam pair and/or the second beam pair. For example, it may be switched to the first beam pair (or first beam) if the signal quality or signal strength measured on the second beam pair (or second beam) is considered to be insufficient, and/or worse than corresponding measurements on the first beam pair indicate. Measurements performed on a beam pair (or beam) may in particular comprise measurements performed on a received beam of the beam pair. It may be considered that the timing indication may be determined before switching from the second beam pair to the first beam pair for communicating. Thus, the synchronization may be in place 8 and/or the timing indication may be available for synchronising) when starting communication utilizing the first beam pair or first beam. However, in some cases the timing indication may be determined after switching to the first beam pair or first beam. This may be in particular useful if first signaling is expected to be received after the switching only, for example based on a periodicity or scheduled timing of suitable reference signaling on the first beam pair, e.g. first received beam.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g. DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g. being configured and/or signaling with control signaling, in particular physical layer signaling and/or higher layer signaling (e.g., DCI and/or RRC signaling), and/or may determine the corresponding information itself, e.g. a network node configuring a UE to transmit reference signaling. Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

References to specific resource structures like an allocation unit and/or block symbol and/or block symbol group and/or transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4, or more symbols, e.g. less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

A transmission quality parameter may in general correspond to the number R of retransmissions and/or number T of total transmissions, and/or coding (e.g., number of coding bits, e.g. for error detection coding and/or error correction coding like FEC coding) and/or code rate and/or BLER and/or BER requirements and/or transmission power level (e.g., minimum level and/or target level and/or base power level P0 and/or transmission power control command, TPC, step size) and/or signal quality, e.g. SNR and/or SIR and/or SINR and/or power density and/or energy density.

A buffer state report (or buffer status report, BSR) may comprise information representing the presence and/or size of data to be transmitted (e.g., available in one or more buffers, for example provided by higher layers). The size may be indicated explicitly, and/or indexed to range/s of sizes, and/or may pertain to one or more different channel/s and/or acknowledgement processes and/or higher layers and/or channel groups/s, e.g., one or more logical channel/s and/or transport channel/s and/or groups thereof: The structure of a BSR may be predefined and/or configurable of configured, e.g. to override and/or amend a predefined structure, for example with higher layer signaling, e.g. RRC signaling. There may be different forms of BSR with different levels of resolution and/or information, e.g. a more detailed long BSR and a less detailed short BSR. A short BSR may concatenate and/or combine information of a long BSR, e.g. providing sums for data available for one or more channels and/or or channels groups and/or buffers, which might be represented individually in a long BSR; and/or may index a less-detailed range scheme for data available or buffered. A BSR may be used in lieu of a scheduling request, e.g. by a network node scheduling or allocating (uplink) resources for the transmitting radio node like a wireless device or UE or IAB node.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and 7 or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g. SC-FDE signaling, may be considered alternatives).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting acknowledgement signaling may in general be based on and/or in response to subject transmission, and/or to control signaling scheduling subject transmission. Such control signaling and/or subject signaling may be transmitted by a signaling radio node (which may be a network node, and/or a node associated to it, e.g. in a dual connectivity scenario. Subject transmission and/or subject signaling may be transmission or signaling to which ACK/NACK or acknowledgement information pertains, e.g. indicating correct or incorrect reception and/or decoding of the subject transmission or signaling. Subject signaling or transmission may in particular comprise and/or be represented by data signaling, e.g. on a PDSCH or PSSCH, or some forms of control signaling, e.g. on a PDCCH or PSSCH, for example for specific formats.

A signaling characteristic may be based on a type or format of a scheduling grant and/or scheduling assignment, and/or type of allocation, and/or timing of acknowledgement signaling and/or the scheduling grant and/or scheduling assignment, and/or resources associated to acknowledgement signaling and/or the scheduling grant and/or scheduling assignment. For example, if a specific format for a scheduling grant (scheduling or allocating the allocated resources) or scheduling assignment (scheduling the subject transmission for acknowledgement signaling) is used or detected, the first or second communication resource may be used. Type of allocation may pertain to dynamic allocation (e.g., using DCI/PDCCH) or semi-static allocation (e.g., for a configured grant). Timing of acknowledgement signaling may pertain to a slot and/or symbol/s the signaling is to be transmitted. Resources used for acknowledgement signaling may pertain to the allocated resources. Timing and/or resources associated to a scheduling grant or assignment may represent a search space or CORESET (a set of resources configured for reception of PDCCH transmissions) in which the grant or assignment is received. Thus, which transmission resource to be used may be based on implicit conditions, requiring low signaling overhead.

Scheduling may comprise indicating, e.g. with control signaling like DCI or SCI signaling and/or signaling on a control channel like PDCCH or PSCCH, one or more scheduling opportunities of a configuration intended to carry data signaling or subject signaling. The configuration may be represented or representable by, and/or correspond to, a table. A scheduling assignment may for example point to an opportunity of the reception allocation configuration, e.g. indexing a table of scheduling opportunities. In some cases, a reception allocation configuration may comprise 15 or 16 scheduling opportunities. The configuration may in particular represent allocation in time. It may be considered that the reception allocation configuration pertains to data signaling, in particular on a physical data channel like PDSCH or PSSCH. In general, the reception allocation configuration may pertain to downlink signaling, or in some scenarios to sidelink signaling. Control signaling scheduling subject transmission like data signaling may point and/or index and/or refer to and/or indicate a scheduling opportunity of the reception allocation configuration. It may be considered that the reception allocation configuration is configured or configurable with higher-layer signaling, e.g. RRC or MAC layer signaling. The reception allocation configuration may be applied and/or applicable and/or valid for a plurality of transmission timing intervals, e.g. such that for each interval, one or more opportunities may be indicated or allocated for data signaling. These approaches allow efficient and flexible scheduling, which may be semi-static, but may updated or reconfigured on useful timescales in response to changes of operation conditions.

Control information, e.g., in a control information message, in this context may in particular be implemented as and/or represented by a scheduling assignment, which may indicate subject transmission for feedback (transmission of acknowledgement signaling), and/or reporting timing and/or frequency resources and/or code resources. Reporting timing may indicate a timing for scheduled acknowledgement signaling, e.g. slot and/or symbol and/or resource set. Control information may be carried by control signaling.

Subject transmissions may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g. in a MIMO scenario, and/or to same or different ports. Generally, subject transmissions may pertain to different HARQ or ARQ processes (or different sub-processes, e.g. in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g. the number of bits and/or whether to provide code block group level response or not. However, it should be noted that the actual structure used may differ from the target structure, e.g. due to the total size of target structures for a subpattern being larger than the predetermined size.

Transmitting acknowledgement signaling, also referred to as transmitting acknowledgement information or feedback information or simply as ARQ or HARQ feedback or feedback or reporting feedback, may comprise, and/or be based on determining correct or incorrect reception of subject transmission/s, e.g. based on error coding and/or based on scheduling assignment/s scheduling the subject transmissions. Transmitting acknowledgement information may be based on, and/or comprise, a structure for acknowledgement information to transmit, e.g. the structure of one or more subpatterns, e.g. based on which subject transmission is scheduled for an associated subdivision. Transmitting acknowledgement information may comprise transmitting corresponding signaling, e.g. at one instance and/or in one message and/or one channel, in particular a physical channel, which may be a control channel. In some cases, the channel may be a shared channel or data channel, e.g. utilising rate-matching of the acknowledgment information. The acknowledgement information may generally pertain to a plurality of subject transmissions, which may be on different channels and/or carriers, and/or may comprise data signaling and/or control signaling. The acknowledgment information may be based on a codebook, which may be based on one or more size indications and/or assignment indications (representing HARQ structures), which may be received with a plurality of control signalings and/or control messages, e.g. in the same or different transmission timing structures, and/or in the same or different (target) sets of resources. Transmitting acknowledgement information may comprise determining the codebook, e.g. based on control information in one or more control information messages and/or a configuration. A codebook may pertain to transmitting acknowledgement information at a single and/or specific instant, e.g. a single PUCCH or PUSCH transmission, and/or in one message or with jointly encoded and/or modulated acknowledgement information. Generally, acknowledgment information may be transmitted together with other control information, e.g. a scheduling request and/or measurement information.

Acknowledgement signaling may in some cases comprise, next to acknowledgement information, other information, e.g. control information, in particular, uplink or sidelink control information, like a scheduling request and/or measurement information, or similar, and/or error detection and/or correction information, respectively associated bits. The payload size of acknowledgement signaling may represent the number of bits of acknowledgement information, and/or in some cases the total number of bits carried by the acknowledgement signaling, and/or the number of resource elements needed. Acknowledgement signaling and/or information may pertain to ARQ and/or HARQ processes; an ARQ process may provide ACK/NACK (and perhaps additional feedback) feedback, and decoding may be performed on each (re-)transmission separately, without soft-buffering/soft-combining intermediate data, whereas HARQ may comprise soft-buffering/soft-combining of intermediate data of decoding for one or more (re-)transmissions.

Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g. due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g. based on error coding and/or reception quality. Reception quality may for example be based on a determined signal quality. Acknowledgement information may generally be transmitted to a signaling radio node and/or node arrangement and/or to a network and/or network node.

Acknowledgement information, or bit/s of a subpattern structure of such information (e.g., an acknowledgement information structure, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of ARQ and/or HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, in particular for forward error correction (FEC), e.g. LDPC or polar coding and/or turbo coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tuples (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. an LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g. via configuration and/or determination, to one or more specific UEs and/or formats of PDCCH and/or DCI and/or identifiers, e.g. UE identifiers and/or RNTIs or carrier/cell identifiers, and/or be represented and/or associated to a CORESET and/or a search space. A search space may comprise and/or be associated to a control region or CORESET and/or time and/or frequency resources, which may be configured and/or indicated for reception of control information and/or signaling on a (e.g., physical) control channel like PDCCH or PSCCH. To a search space, additional parameters and/or conditions may be provided and/or associated, e.g. defining and/or configuring and/or indicating and/or specifying control signaling or control information to search for and/or monitor in the search space, and/or associated control region or CORESET or resources. For example, one or more signaling characteristics of such control signaling and/or control information may be provided, e.g. signaling format and/or possible position within the resources and/or repetition and/or coding and/or priority between different types or formats and/or hashing function.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11 ay. While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some Useful Abbreviations Comprise

ABBREVIATION EXPLANATION

ACK/NACK Acknowledgment/Negative Acknowledgement
ARQ Automatic Repeat reQuest
BER Bit Error Rate
BLER Block Error Rate
BPSK Binary Phase Shift Keying
BWP BandWidth Part
CAZAC Constant Amplitude Zero Cross Correlation
CB Code Block
CBG Code Block Group
CCE Control Channel Element
CDM Code Division Multiplex
CM Cubic Metric
CORESET Control Resource Set
CQI Channel Quality Information
CRB Common Resource Block
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DFTS-FDM DFT-spread-FDM
DM(-)RS Demodulation reference signal(ing)
eMBB enhanced Mobile BroadBand
FDD Frequency Division Duplex
FDE Frequency Domain Equalisation
FDF Frequency Domain Filtering FDM Frequency Division Multiplex
FR1 Frequency Range 1 (for NR)
FR2 Frequency Range 2 (for NR)
HARQ Hybrid Automatic Repeat Request
IAB Integrated Access and Backhaul
IE Information Element
IFFT Inverse Fast Fourier Transform
IR Impulse Response
ISI Inter Symbol Interference
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/
    Multiple Access
PAPR Peak to Average Power Ratio
PBCH Physical Broadcast CHannel
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
PSD Power Spectral Density
(P)SCCH (Physical) Sidelink Control Channel
PSS Primary Synchronisation Signal(ing)
(P)SSCH (Physical) Sidelink Shared Channel
PT(-)RS Phase-Tracking RS
QAM Quadrature Amplitude Modulation
OCC Orthogonal Cover Code
QPSK Quadrature Phase Shift Keying
PSD Power Spectral Density
RAN Radio Access Network
RAT Radio Access Technology
RB Resource Block
REG Resource Element Group
RNTI Radio Network Temporary Identifier
RRC Radio Resource Control
RS Reference Signal(ing)
RX Receiver, Reception, Reception-related/side
SA Scheduling Assignment
SC-FDE Single Carrier Frequency Domain Equalisation
SC-FDM/A Single Carrier Frequency Division Multiplex/
    Multiple Access
SCI Sidelink Control Information
SIB System Information Block
SINR Signal-to-interference-plus-noise ratio
SIR Signal-to-interference ratio
SNR Signal-to-noise-ratio
SR Scheduling Request
SRS Sounding Reference Signal(ing)
SSS Secondary Synchronisation Signal(ing)
SVD Singular-value decomposition
TB Transport Block
TDD Time Division Duplex
TDM Time Division Multiplex
TX Transmitter, Transmission, Transmission-related/side
UCI Uplink Control Information
UE User Equipment
URLLC Ultra Low Latency High Reliability Communi-
    cation
VL-MIMO Very-large multiple-input-multiple-output
VRB Virtual Resource Block
ZF Zero Forcing
ZP Zero-Power, e.g. muted CSI-RS symbol Abbreviations may be considered to follow 3GPP usage if applicable.

The invention claimed is:

1. A method of operating a transmitting radio node in a wireless communication network, the method comprising: transmitting reference signaling based on a reference pilot sequence, the reference pilot sequence being one of a set of reference pilot sequences, at least one reference pilot sequence of the set being a subsequence of another reference pilot sequence of the set, the reference pilot sequences of the set being associated to control signalings of different aggregation levels.

2. The method according to claim 1, wherein each reference pilot sequence of the set is associated to control signaling.

3. The method of claim 2, wherein each reference pilot sequence of the set is associated to control signaling of a set of control signalings.

4. The method according to claim 1, wherein a subsequence of a sequence is determined by truncation or decimation.

5. The method according to claim 1, wherein a subsequence and an associated reference pilot sequence are associated to the same time/frequency location.

6. The method according to claim 1, wherein the reference pilot sequences of the set are based on one or more Zadoff-Chu sequences.

7. The method according to claim 1, wherein the set of reference pilot sequences consists of one reference pilot sequence and subsequences thereof.

8. A transmitting radio node for a wireless communication network, the transmitting radio node comprising processing circuitry being configured to: transmit reference signaling based on a reference pilot sequence, the reference pilot sequence being one of a set of reference pilot sequences, at least one reference pilot sequence of the set being a subsequence of another reference pilot sequence of the set, the reference pilot sequences of the set being associated to control signalings of different aggregation levels.

9. The transmitting radio node according to claim 8, wherein each reference pilot sequence of the set is associated to control signaling.

10. A method of operating a receiving radio node in a wireless communication network, the method comprising: receiving reference signaling based on a reference pilot sequence, the reference pilot sequence being one of a set of reference pilot sequences, at least one reference pilot sequence of the set being a subsequence of another reference pilot sequence of the set, the reference pilot sequences of the set being associated to control signalings of different aggregation levels.

11. The method according to claim 10, wherein each reference pilot sequence of the set is associated to control signaling.

12. The method of claim 10, wherein each reference pilot sequence of the set is associated to control signaling of a set of control signalings.

13. The method according to claim 10, wherein a subsequence of a sequence is determined by truncation or decimation.

14. The method according to claim 10, wherein a subsequence and an associated reference pilot sequence are associated to the same time/frequency location.

15. The method according to claim 10, wherein the reference pilot sequences of the set are based on one or more Zadoff-Chu sequences.

16. The method according to claim 10, wherein the set of reference pilot sequences consists of one reference pilot sequence and subsequences thereof.

17. A receiving radio node for a wireless communication network, the receiving radio node comprising processing circuitry being configured to:

receive reference signaling based on a reference pilot sequence, the reference pilot sequence being one of a set of reference pilot sequences, at least one reference pilot sequence of the set being a subsequence of another reference pilot sequence of the set, the reference pilot sequences of the set being associated to control signalings of different aggregation levels.

18. A non-transitory computer storage medium storing executable program instructions that, when executed, cause processing circuitry to at least one of control and perform a method, the method comprising:

transmitting reference signaling based on a reference pilot sequence, the reference pilot sequence being one of a set of reference pilot sequences, at least one reference pilot sequence of the set being a subsequence of another reference pilot sequence of the set, the reference pilot sequences of the set being associated to control signalings of different aggregation levels.

* * * * *